(12) United States Patent
Xu et al.

(10) Patent No.: US 11,544,820 B2
(45) Date of Patent: Jan. 3, 2023

(54) VIDEO REPAIR METHOD AND APPARATUS, AND STORAGE MEDIUM

(71) Applicant: Beijing Sensetime Technology Development Co., Ltd., Beijing (CN)

(72) Inventors: Rui Xu, Beijing (CN); Xiaoxiao Li, Beijing (CN); Bolei Zhou, Beijing (CN); ChenChange Loy, Beijing (CN)

(73) Assignee: Beijing Sensetime Technology Development Co., Ltd., Beijing (CN)

( * ) Notice: Subject to any disclaimer, the term of this patent is extended or adjusted under 35 U.S.C. 154(b) by 221 days.

(21) Appl. No.: 17/072,527

(22) Filed: Oct. 16, 2020

(65) Prior Publication Data

US 2021/0035268 A1 Feb. 4, 2021

Related U.S. Application Data

(63) Continuation of application No. PCT/CN2019/130428, filed on Dec. 31, 2019.

(30) Foreign Application Priority Data

Jan. 31, 2019 (CN) .......................... 201910099762.4

(51) Int. Cl.
*G06T 5/00* (2006.01)
(52) U.S. Cl.
CPC .... *G06T 5/001* (2013.01); *G06T 2207/10016* (2013.01)
(58) Field of Classification Search
None
See application file for complete search history.

(56) References Cited

U.S. PATENT DOCUMENTS 7,512,179 B2 * 3/2009 Sanson ................ H04N 19/553
375/240
10,636,193 B1 * 4/2020 Sheikh .................. G06V 20/20
(Continued)

FOREIGN PATENT DOCUMENTS

| CN | 105025201 | 11/2015 |
| CN | 106204567 | 12/2016 |

(Continued)

OTHER PUBLICATIONS

WIPO, International Search Report dated Apr. 1, 2020, in PCT/CN2019/130428, 2 pgs.

(Continued)

*Primary Examiner* — Randolph I Chu
(74) *Attorney, Agent, or Firm* — Henry Patent Law Firm PLLC

(57) ABSTRACT

The present disclosure relates to a video repair method and apparatus, an electronic device, and a storage medium. The method includes: acquiring first forward optical flows and first reverse optical flows between adjacent images among continuous multiple frames of images; respectively performing optical flow optimization processing on the first forward optical flows and the first reverse optical flows to obtain second forward optical flows corresponding to the first forward optical flows and second reverse optical flows corresponding to the first reverse optical flows; performing forward and reverse conduction optimization on the continuous multiple frames of images by utilizing the second forward and the second reverse optical flows, respectively, until all the images in the optimized continuous multiple frames of images satisfy repair requirements; and obtaining repaired images of the continuous multiple frames of images according to the optimized images obtained by the forward (Continued)

conduction optimization and the reverse conduction optimization.

20 Claims, 4 Drawing Sheets

(56) References Cited

U.S. PATENT DOCUMENTS

| | | | | |
|---|---|---|---|---|
| 11,222,211 | B2* | 1/2022 | Li | G06V 10/25 |
| 2015/0324636 | A1* | 11/2015 | Bentley | A63F 13/212 |
| | | | | 386/227 |
| 2017/0270677 | A1 | 9/2017 | Peleg et al. | |
| 2018/0324465 | A1 | 11/2018 | Aydin et al. | |
| 2020/0380661 | A1* | 12/2020 | Qiu | G06T 7/0002 |
| 2021/0065340 | A1* | 3/2021 | El-Khamy | G06T 5/50 |
| 2022/0092795 | A1* | 3/2022 | Liu | G06N 3/084 |
| 2022/0222833 | A1* | 7/2022 | Zhang | G06T 7/248 |

FOREIGN PATENT DOCUMENTS

| | | |
|---|---|---|
| CN | 106973293 | 7/2017 |
| CN | 107292912 | 10/2017 |
| CN | 107480646 | 12/2017 |
| CN | 108090919 | 5/2018 |
| CN | 109086807 | 12/2018 |
| CN | 109816611 | 5/2019 |
| JP | 2019509566 | 4/2019 |
| JP | 2019525515 | 9/2019 |
| KR | 20090041562 | 4/2009 |
| WO | 20171155663 | 9/2017 |
| WO | 2017213923 | 12/2017 |
| WO | 2020156009 | 8/2020 |

OTHER PUBLICATIONS

"Motion detection using block based bi-directional optical flow method", J. Vis. Commun. Image R. (2017); doi: http://dx.doi.org/10.1016/j.jvcir.2017.08.007, Aug. 2017, 36 pgs.

"Video background completion with complexly moving camera", Journal of Computer Applications, Dec. 10, 2014, 6 pgs.

Choi, et al., "Optical Flow Estimation Considering Occlusion and Boundary", The Institute of Electronics and Information Engineers; published online http://www.dbpia.co.kr/journal/articleDetail?nodeId=NODE01381432, Jul. 2009, 3 pgs.

* cited by examiner

VIDEO REPAIR METHOD AND APPARATUS, AND STORAGE MEDIUM

The present disclosure is a continuation of and claims priority under 35 U.S.C. § 120 to PCT Application. No. PCT/CN2019/130428, filed on Dec. 31, 2019, which claims priority to Chinese Patent Application No. 201910099762.4, filed with the Chinese Patent Office on Jan. 31, 2019 and entitled "VIDEO REPAIR METHOD AND APPARATUS, ELECTRONIC DEVICE, AND STORAGE MEDIUM". All the above referenced priority documents are incorporated herein by reference in its entirety.

TECHNICAL FIELD

The present disclosure relates to the field of video repair, and in particular, to a video repair method and apparatus, an electronic device, and a storage medium.

BACKGROUND

Image repair is always an important issue in computer vision, and is significantly applied to many fields, for example, achieving the purposes such as image watermark removal and image inpainting by means of image repair. As an extension of an image repair issue in a video, video repair is more difficult to implement than a simple image repair issue. However, with the development of the Internet, an application of a video repair algorithm has a wider prospect, for example, a video watermark needs to be removed and certain parts of the video needs to be removed, etc.

SUMMARY

Embodiments of the present disclosure provide solutions for video repair.

According to one aspect of the present disclosure, provided is a video repair method, including: acquiring first forward optical flows and first reverse optical flows between adjacent images among continuous multiple frames of images; respectively performing optical flow optimization processing on the first forward optical flows and the first reverse optical flows to obtain second forward optical flows corresponding to the first forward optical flows and second reverse optical flows corresponding to the first reverse optical flows; performing forward conduction optimization on the continuous multiple frames of images by utilizing the second forward optical flows, and performing reverse conduction optimization on the continuous multiple frames of images by utilizing the second reverse optical flows until all the images in the optimized continuous multiple frames of images satisfy repair requirements; and obtaining repaired images of the continuous multiple frames of images according to the optimized images obtained by the forward conduction optimization and the reverse conduction optimization.

In some possible implementations, acquiring the first forward optical flows and the first reverse optical flows between the adjacent images among the continuous multiple frames of images includes: acquiring a mask map of each image among the multiple frames of images, where the mask map represents an area to be repaired of a corresponding image; determining forward optical flows between the adjacent images in a forward sequence of time frames of the multiple frames of images, and determining reverse optical flows between the adjacent images in a reverse sequence of the time frames of the multiple frames of images; and multiplying a forward optical flow between the $i^{-th}$ image and the $(i+1)^{-th}$ image by a mask map of the $(i+1)^{-th}$ image to obtain a first forward optical flow between the $i^{-th}$ image and the $(i+1)^{-th}$ image, and multiplying a reverse optical flow between the $(i+1)^{-th}$ image and the $i^{-th}$ image by a mask map of the $i^{-th}$ image to obtain a first reverse optical flow between the $(i+1)^{-th}$ image and the $i^{-th}$ image, where i is a positive integer greater than or equal to 1 and less than G, and G is the number of images among the multiple frames of images.

In some possible implementations, respectively performing optical flow optimization processing on the first forward optical flows and the first reverse optical flows includes: connecting the first forward optical flows to obtain a first connection optical flow, and connecting the first reverse optical flows to obtain a second connection optical flow; respectively performing N optical flow optimization processings on the first connection optical flow and the second connection optical flow to obtain a first optimized optical flow corresponding to the first connection optical flow, and a second optimized optical flow corresponding to the second connection optical flow, where N is a positive integer greater than or equal to 1; and obtaining a second forward optical flow corresponding to each first forward optical flow according to the first optimized optical flow, and obtaining a second reverse optical flow corresponding to each first reverse optical flow according to the second optimized optical flow.

In some possible implementations, respectively performing the N optical flow optimization processings on the first connection optical flow and the second connection optical flow includes: performing the first optical flow optimization processing on the first connection optical flow and the second connection optical flow to obtain a first optimized sub-optical flow corresponding to the first connection optical flow, and a first optimized sub-optical flow corresponding to the second connection optical flow; and respectively performing the $(i+1)^{-th}$ optical flow optimization processing on the $i^{-th}$ optimized sub-optical flow of the first connection optical flow and the $i^{-th}$ optimized sub-optical flow of the second connection optical flow to obtain the $(i+1)^{-th}$ optimized sub-optical flow corresponding to the first connection optical flow, and the $(i+1)^{-th}$ optimized sub-optical flow corresponding to the second connection optical flow, where i is a positive integer greater than 1 and less than N; where by means of the $N^{-th}$ optimization processing, the obtained $N^{-th}$ optimized sub-optical flow of the first connection optical flow is determined as the first optimized optical flow, and the obtained $N^{-th}$ optimized sub-optical flow of the second connection optical flow is determined as the second optimized optical flow, where each optical flow optimization processing includes residual processing and upper sampling processing.

In some possible implementations, performing the forward conduction optimization on the continuous multiple frames of images by utilizing the second forward optical flows includes: acquiring the mask map of each image among the multiple frames of images, where the mask map represents the area to be repaired of the corresponding image; obtaining first repaired images of images other than a first image according to the second forward optical flows in the forward sequence of the time frames of the multiple frames of images; and adjusting the mask map of the corresponding image on the basis of an obtained first repaired image, and returning to execute the previous step until the adjusted mask map indicates that no area to be repaired exists, to determine that the images among the multiple frames of images satisfy the repair requirements.

In some possible implementations, obtaining a first repaired image of each image according to the second forward optical flows in the forward sequence of the time frames of the multiple frames of images includes: performing offset processing on the first image according to the first second forward optical flow in the forward sequence of the time frames of the multiple frames of images to obtain a first repaired image of a second image; and performing summation processing on the $k^{-th}$ image and a repaired image of the $k^{-th}$ image to obtain a first summation image of the $k^{-th}$ image, and performing offset processing on the $k^{-th}$ first summation image according to the $k^{-th}$ second forward optical flow to obtain a first repaired image of the $(k+1)^{-th}$ image, where k is a positive integer greater than 1 and less than G, and G represents the number of images among the multiple frames of images.

In some possible implementations, performing the reverse conduction optimization on the continuous multiple frames of images by utilizing the second reverse optical flows includes: acquiring the mask map of each image among the multiple frames of images, where the mask map represents the area to be repaired of the corresponding image; obtaining second repaired images of the images other than the first image according to the second reverse optical flows in the reverse sequence of the time frames of the multiple frames of images; and adjusting the mask map of the corresponding image on the basis of the obtained second repaired image, and returning to execute the previous step until the adjusted mask map indicates that no area to be repaired exists, to determine that the images among the multiple frames of images satisfy the repair requirements.

In some possible implementations, obtaining second repaired images of the images other than the first image according to the second reverse optical flows in the reverse sequence of the time frames of the multiple frames of images includes: performing offset processing on the first image according to the first second reverse optical flow in the reverse sequence of the time frames of the multiple frames of images to obtain a second repaired image of the second image; and performing summation processing on the $h^{-th}$ image and a repaired image of the $h^{-th}$ image to obtain a second summation image of the $h^{-th}$ image, and performing offset processing on the $h^{-th}$ second summation image according to the $h^{-th}$ second reverse optical flow to obtain a second repaired image of the $(h+1)^{-th}$ image, where h is a positive integer greater than 1 and less than or equal to G, and G represents the number of images among the multiple frames of images.

In some possible implementations, obtaining repaired images of the continuous multiple frames of images according to the optimized images obtained by the forward conduction optimization and the reverse conduction optimization includes: obtaining, in the forward sequence of the time frames of the multiple frames of images, a first optimized image obtained by the forward conduction optimization; obtaining, in the forward sequence of the time frames of the multiple frames of images, a second optimized image obtained by the reverse conduction optimization; and obtaining a repaired image of each image according to average values of a first optimized image and a second optimized image of the image, so as to obtain the repaired image of each image among the multiple frames of images.

In some possible implementations, the method includes: performing, by means of an optical flow optimization module, optical flow optimization processing respectively performed on the first forward optical flows and the first reverse optical flows to obtain the second forward optical flows corresponding to the first forward optical flows, and the second reverse optical flows corresponding to the first reverse optical flows; the method further includes: a step of training the optical flow optimization module, comprising: acquiring a training sample, where the training sample comprises multiple groups of optical flow samples, and a mask sample and a real optical flow corresponding to each optical flow sample; performing optical flow optimization processing on the optical flow sample by utilizing the optical flow optimization module to obtain a corresponding optimized optical flow; selecting, on the basis of a result of comparison between the optimized optical flow and the real optical flow, a first pixel point satisfying a first requirement from the optimized optical flow, and adjusting a mask value of the first pixel point in the mask map to obtain a new mask sample; obtaining, according to a preset loss function, a loss value on the basis of the optimized optical flow, an original mask sample, and the new mask sample; and obtaining a trained optical flow optimization module if the loss value satisfies training requirements, and otherwise, adjusting network parameters of the optical flow optimization module and re-performing optical flow optimization processing of the optical flow sample until the obtained loss value satisfies the training requirements.

In some possible implementations, the expression of the preset loss function is:

$$L = \frac{\|M \odot (f - \hat{f})\|_1}{\|M\|_1} + \lambda * \frac{\|M^h \odot (f - \hat{f})\|_1}{\|M\|_1};$$

where L represents a loss function of optical flow optimization processing, M is an original mask sample, $M^h$ represents a new mask sample, f represents an obtained optimized optical flow, $\hat{f}$ represents a real optical flow, and $\lambda$ is a weight.

According to a second aspect of the present disclosure, provided is a video repair apparatus, including:

an acquisition module configured to acquire first forward optical flows and first reverse optical flows between adjacent images among continuous multiple frames of images; an optical flow optimization module configured to respectively perform optical flow optimization processing on the first forward optical flows and the first reverse optical flows to obtain second forward optical flows corresponding to the first forward optical flows and second reverse optical flows corresponding to the first reverse optical flows; a conduction optimization module configured to perform forward conduction optimization on the continuous multiple frames of images by utilizing the second forward optical flows, and to perform reverse conduction optimization on the continuous multiple frames of images by utilizing the second reverse optical flows until all the images in the optimized continuous multiple frames of images satisfy repair requirements; and a repair module configured to obtain repaired images of the continuous multiple frames of images according to the optimized images obtained by the forward conduction optimization and the reverse conduction optimization.

In some possible implementations, the acquisition module is further configured to acquire a mask map of each image among the multiple frames of images, to determine forward optical flows between the adjacent images in a forward sequence of time frames of the multiple frames of images, and to determine reverse optical flows between the adjacent images in a reverse sequence of the time frames of the multiple frames of images; and to multiply a forward optical flow between the $i^{-th}$ image and the $(i+1)^{-th}$ image by a mask map of the $(i+1)^{-th}$ image to obtain a first forward optical flow between the $i^{-th}$ image and the $(i+1)^{-th}$ image, and to multiply a reverse optical flow between the $(i+1)^{-th}$ image and the $i^{-th}$ image by a mask map of the $i^{-th}$ image to obtain a first reverse optical flow between the $(i+1)^{-th}$ image and the $i^{-th}$ image, where the mask map represents an area to be repaired of a corresponding image, i is a positive integer greater than or equal to 1 and less than G, and G is the number of images among the multiple frames of images.

In some possible implementations, the optical flow optimization module is further configured to connect the first forward optical flows to obtain a first connection optical flow, and to connect the first reverse optical flows to obtain a second connection optical flow, to respectively perform N optical flow optimization processings on the first connection optical flow and the second connection optical flow to obtain a first optimized optical flow corresponding to the first connection optical flow, and a second optimized optical flow corresponding to the second connection optical flow, where N is a positive integer greater than or equal to 1; and to obtain a second forward optical flow corresponding to each first forward optical flow according to the first optimized optical flow, and to obtain a second reverse optical flow corresponding to each first reverse optical flow according to the second optimized optical flow.

In some possible implementations, the optical flow optimization module is further configured to perform the first optical flow optimization processing on the first connection optical flow and the second connection optical flow to obtain a first optimized sub-optical flow corresponding to the first connection optical flow, and a first optimized sub-optical flow corresponding to the second connection optical flow; and to respectively perform the $(i+1)^{-th}$ optical flow optimization processing on the $i^{-th}$ optimized sub-optical flow of the first connection optical flow and the $i^{-th}$ optimized sub-optical flow of the second connection optical flow to obtain the $(i+1)^{-th}$ optimized sub-optical flow corresponding to the first connection optical flow, and the $(i+1)^{-th}$ optimized sub-optical flow corresponding to the second connection optical flow, where i is a positive integer greater than 1 and less than N; where by means of the $N^{-th}$ optimization processing, the obtained $N^{-th}$ optimized sub-optical flow of the first connection optical flow is determined as the first optimized optical flow, and the obtained $N^{-th}$ optimized sub-optical flow of the second connection optical flow is determined as the second optimized optical flow, where each optical flow optimization processing includes residual processing and upper sampling processing.

In some possible implementations, the conduction optimization module includes a first conduction optimization unit configured to acquire the mask map of each image among the multiple frames of images, where the mask map represents the area to be repaired of the corresponding image; to obtain first repaired images of images other than a first image according to the second forward optical flows in the forward sequence of the time frames of the multiple frames of images; and to adjust the mask map of the corresponding image on the basis of an obtained first repaired image, and return to execute the previous step until the adjusted mask map indicates that no area to be repaired exists, to determine that the images among the multiple frames of images satisfy the repair requirements.

In some possible implementations, the first conduction optimization unit is further configured to perform offset processing on the first image according to the first second forward optical flow in the forward sequence of the time frames of the multiple frames of images to obtain a first repaired image of a second image; and to perform summation processing on the $k^{-th}$ image and a repaired image of the $k^{-th}$ image to obtain a first summation image of the $k^{-th}$ image, and to perform offset processing on the $k^{-th}$ first summation image according to the $k^{-th}$ second forward optical flow to obtain a first repaired image of the $(k+1)^{-th}$ image, where k is a positive integer greater than 1 and less than G, and G represents the number of images among the multiple frames of images.

In some possible implementations, the conduction optimization module further includes a second conduction optimization unit configured to acquire the mask map of each image among the multiple frames of images, where the mask map represents the area to be repaired of the corresponding image; to obtain second repaired images of the images other than the first image according to the second reverse optical flows in the reverse sequence of the time frames of the multiple frames of images; and to adjust the mask map of the corresponding image on the basis of the obtained second repaired image, and return to execute the previous step until the adjusted mask map indicates that no area to be repaired exists, to determine that the images among the multiple frames of images satisfy the repair requirements.

In some possible implementations, the second conduction optimization unit is further configured to perform offset processing on the first image according to the first second reverse optical flow in the reverse sequence of the time frames of the multiple frames of images to obtain a second repaired image of the second image; and to perform summation processing on the $h^{-th}$ image and a repaired image of the $h^{-th}$ image to obtain a second summation image of the h-th image, and to perform offset processing on the $h^{-th}$ second summation image according to the h-th second reverse optical flow to obtain a second repaired image of the $(h+1)^{-th}$ image, where h is a positive integer greater than 1 and less than or equal to G, and G represents the number of images among the multiple frames of images.

In some possible implementations, the repair module is further configured to obtain, in the forward sequence of the time frames of the multiple frames of images, a first optimized image obtained by the forward conduction optimization, and to obtain, in the forward sequence of the time frames of the multiple frames of images, a second optimized image obtained by the reverse conduction optimization; and to obtain a repaired image of each image according to average values of a first optimized image and a second optimized image of the image, so as to obtain the repaired image of each image among the multiple frames of images.

In some possible implementations, a training module is further included and is configured to train the optical flow optimization module and configured to input a training sample to the optical flow optimization module, where the training sample includes multiple groups of optical flow samples, and a mask sample and a real optical flow corresponding to each optical flow sample; to perform optical flow optimization processing on the optical flow sample by utilizing the optical flow optimization module to obtain a corresponding optimized optical flow; to select, on the basis of a result of comparison between the optimized optical flow and the real optical flow, a first pixel point satisfying a first requirement from the optimized optical flow, and to adjust a mask value of the first pixel point in the mask map to obtain a new mask sample; to obtain, according to a preset loss function, a loss value on the basis of the optimized optical flow, an original mask sample, and the new mask sample; and to obtain a trained optical flow optimization module if the loss value satisfies training requirements, and otherwise, to adjust network parameters of the optical flow optimization module and re-perform optical flow optimization processing of the optical flow sample until the obtained loss value satisfies the training requirements.

In some possible implementations, the expression of the preset loss function is:

$$L = \frac{\|M \odot (f - \hat{f})\|_1}{\|M\|_1} + \lambda * \frac{\|M^h \odot (f - \hat{f})\|_1}{\|M\|_1};$$

where L represents a loss function of optical flow optimization processing, M is an original mask sample, $M^h$ represents a new mask sample, f represents an obtained optimized optical flow, $\hat{f}$ represents a real optical flow, and $\lambda$ is a weight.

According to a third aspect of the present disclosure, provided is an electronic device, including:
a processor; and
a memory configured to store processor-executable instructions;
where the processor is configured to implement the method according to any one of the implementations in the first aspect.

According to a fourth aspect of the present disclosure, provided is a computer-readable storage medium, having computer program instructions stored thereon, where when the computer program instructions are executed by a processor, the method according to any one of the implementations in the first aspect is implemented.

According to a fifth aspect of the present disclosure, provided is a computer program, including a computer-readable code, where when the computer-readable code runs in an electronic device, a processor in the electronic device executes instructions for implementing the method according to any one of the implementations in the first aspect.

According to the embodiments of the present disclosure, repair processing can be performed on video images of multiple continuous time frames simultaneously, where first, optimization is performed on forward optical flows and reverse optical flows between adjacent frame images to obtain repaired optical flows having relatively high precision, and then guiding is performed on video repair by means of the optimized forward optical flows and reverse optical flows to complete the modification of a video image. The process can improve the accuracy of the video repair, and also improve the continuity and consistency among frames. In addition, according to the embodiments of the present disclosure, a high repair speed is achieved, and the real-time property of repair may be satisfied.

It should be understood that the above general description and the following detailed description are merely exemplary and explanatory, and are not intended to limit the present disclosure.

The other features and aspects of the present disclosure can be described more clearly according to the detailed descriptions of the exemplary embodiments in the accompanying drawings.

BRIEF DESCRIPTION OF THE DRAWINGS

The accompanying drawings here incorporated in the specification and constituting a part of the specification describe the embodiments of the present disclosure and are intended to explain the technical solutions of the present disclosure together with the specification.

DETAILED DESCRIPTION

Figure 1:
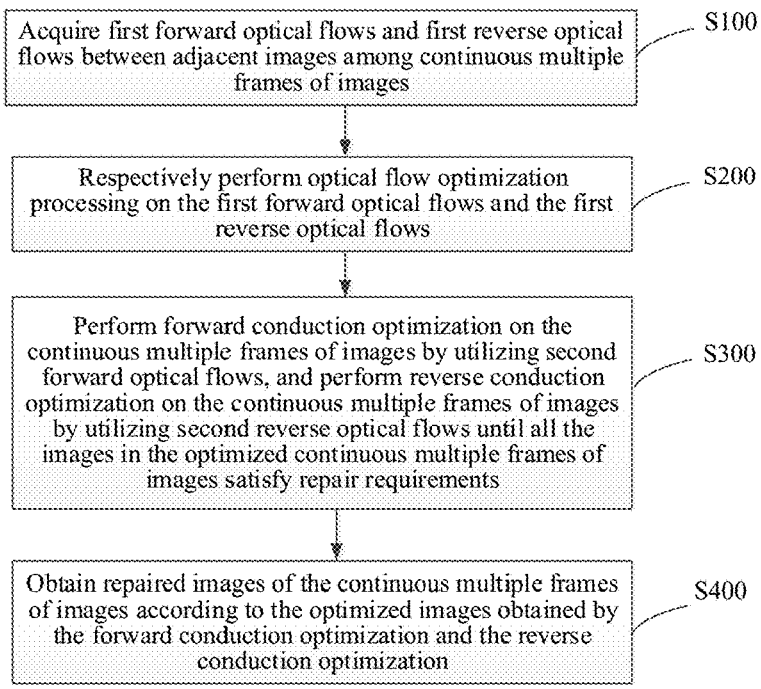
FIG. 1 shows a flowchart of a video repair method according to the embodiments of the present disclosure.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion. The special term "exemplary" herein means "used as examples, embodiments, or descriptions". Any embodiment herein described by the term "exemplary" is not necessarily construed as being superior to or better than other embodiments.

The term "and/or" herein is merely an association relationship describing associated objects, indicating that there may be three relationships, for example, A and/or B, which may indicate that A exists separately, and both A and B exist, and B exists separately. In addition, the term "at least one" herein means any one of multiple elements or any combination of at least two of the multiple elements, for example, including at least one of A, B, or C, which may indicate that any one or more elements selected from a set consisting of A, B, and C are included.

In addition, numerous details are given in the following detailed description for the purpose of better explaining the present disclosure. A person skilled in the art should understand that the present disclosure may still be implemented even without some of those details. In some examples, methods, means, elements, and circuits that are well known to a person skilled in the art are not described in detail so that the principle of the present disclosure becomes apparent.

FIG. 1 shows a flowchart of a video repair method according to the embodiments of the present disclosure. The video repair method according to the embodiments of the present disclosure may be used for repairing a video image. Furthermore, according to the embodiments of the present disclosure, the consistency of repair of continuous video frames can be ensured, and high repair precision and high efficiency can be achieved.

The embodiments of the present disclosure may be applied to an image processing device or a video capture device, where the image processing device may be any terminal device or server device, such as a mobile phone, a camera, a laptop computer, a PAD, and a cloud server. The video repair method according to the embodiments of the present disclosure may be applied as long as the device has an image processing function or can capture video information. The embodiments of the present disclosure are described in detail below.

As shown in FIG. 1, the video repair method according to the embodiments of the present disclosure may include the following steps.

At S100, first forward optical flows and first reverse optical flows between adjacent images among continuous multiple frames of images are acquired.

At S200, optical flow optimization processing is respectively performed on the first forward optical flows and the first reverse optical flows to obtain second forward optical flows corresponding to the first forward optical flows and second reverse optical flows corresponding to the first reverse optical flows.

At S300, forward conduction optimization is performed on the continuous multiple frames of images by utilizing the second forward optical flows, and reverse conduction optimization is performed on the continuous multiple frames of images by utilizing the second reverse optical flows until all the images in the optimized continuous multiple frames of images satisfy repair requirements.

At S400, repaired images of the continuous multiple frames of images are obtained according to the optimized images obtained by the forward conduction optimization and the reverse conduction optimization.

In the embodiments of the present disclosure, a video repair process may be performed via a constructed neural network, for example, repair of a video image is implemented via a deep learning neural network, and no specific limitation is made thereto in the present disclosure. In the embodiments of the present disclosure, the video repair process may also be performed by means of an algorithm matching the function limited in the embodiments of the present disclosure.

Before step S100, a video image to be repaired may be acquired first, and continuous video frame images are acquired (i.e., the continuous multiple frames of images), where in the embodiments of the present disclosure, a preset number of continuous time frames of images, such as 5 frames of images, may be acquired, or in other embodiments, the preset number may also be another numerical value, and may be set by a person skilled in the art according to different requirements and situations.

After acquiring the continuous multiple frames of images, repair processing may be performed on the multiple frames of images. First, at step S100, optical flows between adjacent images may be acquired, where the adjacent images are two adjacent frames of images. Because the time frames are sequential, in the embodiments of the present disclosure, processing may be performed on the images in forward and reverse directions of time, so as to implement the repair of a video.

In addition, an optical flow may be used for representing a change between motion images, and refers to a mode motion speed in a time-varying image. When a target object moves, the brightness mode of the target object on a corresponding point in the image also moves. Therefore, the optical flow may be used for representing the change between the images. Because the optical flow includes information of the motion of a target, the optical flow may be used for determining the motion situation of the target by an observer.

Accordingly, in the embodiments of the present disclosure, at step S100, the optical flows between every two adjacent images may be acquired, for example, the first forward optical flows between the two adjacent images are obtained in a forward sequence of time frames, and the first reverse optical flows between the two adjacent images are obtained in a reverse sequence of time frames, where it is assumed that the multiple frames of images in the embodiments of the present disclosure are $\{P_1, P_2, \ldots P_G\}$, i.e., G frames of images may be included, for example, G may be 5 or another numerical value. First forward optical flows $\{f_{1 \to 2}, f_{2 \to 3}, \ldots, f_{G-1 \to G}\}$ may be acquired in the forward sequence of the time frames, where $f_{i \to i+1}$, represents first forward optical flows from image $P_i$ to image $P_{i+1}$, and i is any integer greater than or equal to 1 and less than G. In addition, first reverse optical flows $\{f_{G \to G-1}, f_{G-1 \to G-2}, \ldots, f_{2 \to 1}\}$ may be acquired in the reverse sequence of the time frames, where i represents a first reverse optical flow from image $P_{j+1}$ to image $P_j$, and j is an integer greater than or equal to 1 and less than G.

In the embodiments of the present disclosure, the first forward optical flows and the first reverse optical flows between the images may be obtained by utilizing an optical flow estimation model, for example, the optical flow estimation model may be FlowNet 2.0. In other embodiments of the present disclosure, the optical flows between the images may also be acquired in other manners, and no specific limitation is made thereto in the present disclosure.

Figure 2:
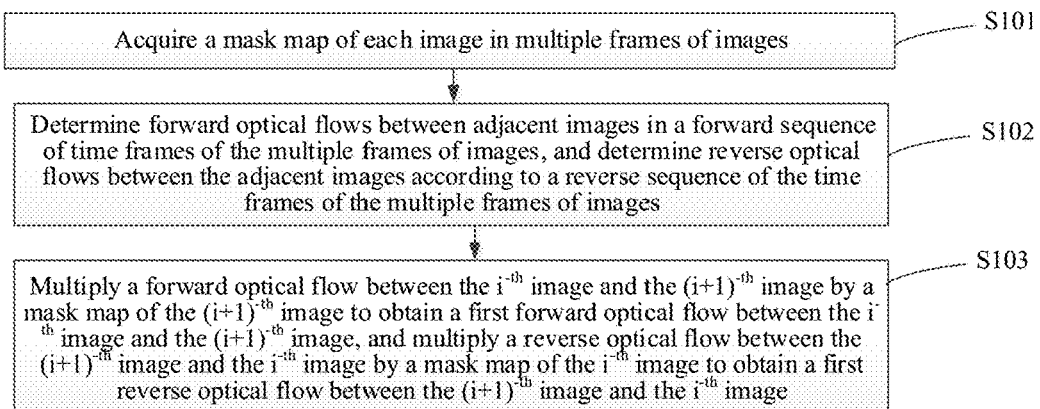
FIG. 2 shows a flowchart of step S100 of a video repair method according to the embodiments of the present disclosure.

In addition, in order to improve the accuracy of optical flow optimization, in the embodiments of the present disclosure, processing may also be performed on the optical flows between the images by combining a mask map to obtain the first forward optical flows and the first reverse optical flows. FIG. 2 shows a flowchart of step S100 of a video repair method according to the embodiments of the present disclosure. Acquiring the first forward optical flows and the first reverse optical flows between the adjacent images in the continuous multiple frames of images may include the following steps.

At S101, a mask map of each image among the multiple frames of images is acquired, where the mask map represents an area to be repaired of a corresponding image.

In the embodiments of the present disclosure, each frame of image among the obtained multiple frames of images may have a corresponding mask map, and the mask map may be manually determined. For example, a corresponding mask map is established according to an area that needs to be repaired in each image, where the scale of the mask map is the same as that of a corresponding image, and pixel points in the mask map having one-to-one correspondence to pixel points in the corresponding image. In the embodiments of the present disclosure, the mask of the pixel points in the area to be repaired in the mask map may be defined as 1, and the mask of the pixel points in the remaining areas that do not need to be repaired in the mask map are defined as 0, or the mask of the pixel points in the area to be repaired in the mask map may also be defined as 0, and the mask of the pixel points in the remaining areas that do not need to be repaired in the mask map are defined as 1. A person skilled in the art may set the masks according to different requirements, and no specific limitation is made thereto in the present disclosure.

At S102, forward optical flows between the adjacent images are determined in a forward sequence of time frames of the multiple frames of images, and reverse optical flows between the adjacent images are determined in a reverse sequence of the time frames of the multiple frames of images.

The process is the same as the optical flow determination process determined in the foregoing embodiments, for example, the forward optical flows and the reverse optical flows between the adjacent images among the multiple frames of images are obtained by means of the optical flow estimation model, and the process is not described in detail herein again.

It should be noted here that the order of step S101 and step S102 is not specifically limited in the embodiments of the present disclosure, and step S101 may be executed before step S102, and may also be executed after step S102, or step S101 and step S102 may also be simultaneously executed. Said steps may be taken as the embodiments of the present disclosure as long as the mask map of each image and the forward optical flows and the reverse optical flows between any two adjacent images are determined before executing step S103.

At S103, a forward optical flow between the $i^{-th}$ image and the $(i+1)^{-th}$ image is multiplied by a mask map of the $(i+1)^{-th}$ image to obtain a first forward optical flow between the $i^{-th}$ image and the $(i+1)^{-th}$ image, and a reverse optical flow between the $(i+_1)^{-th}$ image and the $i^{-th}$ image is multiplied by a mask map of the $i^{-th}$ image to obtain a first reverse optical flow between the $(i+1)^{-th}$ image and the $i^{-th}$ image, where i is a positive integer greater than or equal to 1 and less than G, and G is the number of images among the multiple frames of images.

That is, in the embodiments of the present disclosure, the forward optical flow may be multiplied by the corresponding mask map, i.e., an optical flow area that needs to be optimized in the forward optical flow is determined to obtain a corresponding first forward optical flow. Similarly, the reverse optical flow may also be multiplied by the corresponding mask map, i.e., an optical flow area that needs to be optimized in the reverse optical flow may be determined to obtain a corresponding first reverse optical flow.

As described in the foregoing embodiments, the multiple frames of images may be $\{P_1, P_2, \ldots P_G\}$, the obtained forward optical flows between the adjacent images may be $\{f_{1 \to 2}, f_{2 \to 3}, \ldots, f_{G-1 \to G}\}$, and the reverse optical flows between the images may be $\{f_{G \to G-1}, f_{G-1 \to G-2}, \ldots, f_{2 \to 1}\}$. The mask map of each image may be represented as $\{M_1, M_2, \ldots, M_G\}$, where $M_k$ represents a mask map of the $k^{-th}$ image $P_k$, and k is an integer greater than or equal to 1 and less than or equal to G.

Accordingly, in the embodiments of the present disclosure, a forward optical flow between a first image $P_1$ and a second image $P_2$ is obtained, the forward optical flow may be multiplied by a mask map $M_2$ of the second image $P_2$, for example, corresponding elements multiply each other, to obtain the first forward optical flow between the first image $P_1$ and the second image $P_2$. Similarly, a forward optical flow between the second image $P_2$ and a third image $P_3$ may be obtained, and the forward optical flow may be multiplied by a mask map $M_3$ of the third image $P_3$, for example, corresponding elements multiply each other, to obtain the first forward optical flow between the second image $P_2$ and the third image $P_3$. Similarly, the forward optical flow between the $i^{-th}$ image and the $(i+1)^{-th}$ image may be multiplied by the mask map of the $(i+1)^{-th}$ image, for example, corresponding elements multiply each other, to obtain the first forward optical flow between the $i^{-th}$ image and the $(i+1)^{-th}$ image. The first forward optical flows $\{f_{1 \to 2}, f_{2 \to 3}, \ldots, f_{G-1 \to G}\}$ between the adjacent images may be obtained in the manner above.

In addition, similarly, after the embodiments of the present disclosure obtain a reverse optical flow between the last image $P_G$ and the second-to-last image $P_{G-1}$, the reverse optical flow may be multiplied by a mask map $M_{G-1}$ of the second-to-last image $P_{G-1}$, for example, corresponding elements multiply each other, to obtain the first reverse optical flow between the last image $P_G$ and the second-to-last image $P_{G-1}$. Similarly, a reverse optical flow between the second-to-last image $P_{G-1}$ and the third-to-last image $P_{G-2}$ may be obtained, and the reverse optical flow may be multiplied by a mask map $M_{G-2}$ of the third-to-last image $P_{G-2}$, for example, corresponding elements multiply each other, to obtain the first reverse optical flow between the second-to-last image $P_{G-1}$ and the third-to-last image $P_{G-2}$. Similarly, the reverse optical flow between the $(i+1)^{-th}$ image and the $i^{-th}$ mag may be multiplied by the mask map of the $i^{-th}$ image, for example, corresponding elements multiply each other, to obtain the first reverse optical flow between the $(i+1)^{-th}$ image and the $i^{-th}$ image. The first reverse optical flows $\{f_{(i \to G-1)}, f_{G-1 \to G-2}, \ldots, f_{2 \to 1}\}$ between the adjacent images may be obtained in the manner above.

In the embodiments of the present disclosure, by multiplying the obtained forward optical flow and reverse optical flow with the mask map of the corresponding image, a corresponding first forward optical flow and a corresponding first reverse optical flow are obtained. Because the obtained first forward optical flow and first reverse optical flow may include an area where optical flow optimization needs to be performed, the optimization precision of the optical flows may be improved.

After the first forward optical flows and the first reverse optical flows between the images are obtained, optimization processing may be performed on the optical flows, i.e., step S200 may be executed. In the embodiments of the present disclosure, optimization may be respectively performed on the first forward optical flows and the first reverse optical flows to obtain corresponding second forward optical flows and corresponding second reverse optical flows. The optical flow optimization process in the embodiments of the present disclosure may be implemented via an optical flow optimization network, where the optical flow optimization network may include at least one optical flow optimization network module, and all the optical flow optimization network modules are the same, and the number of optical flow optimizations may be determined according to the number of the optical flow optimization network modules. The number of optical flow optimization processings is not specifically limited in the embodiments of the present disclosure, and may be selected and set by a person skilled in the art according to different requirements. The optimization processes of the first forward optical flow and the first reverse optical flow are respectively described in detail below.

Figure 3:
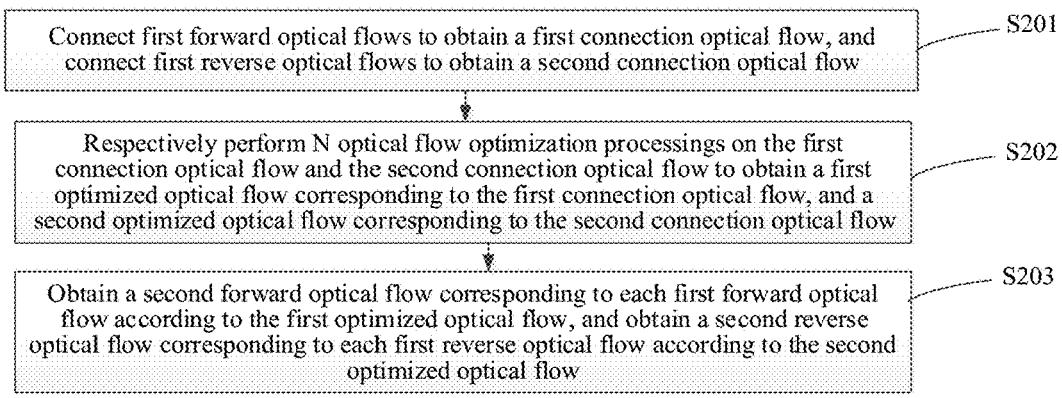
FIG. 3 shows a flowchart of step S200 of a video repair method according to the embodiments of the present disclosure.

FIG. 3 shows a flowchart of step S200 of a video repair method according to the embodiments of the present disclosure, where respectively performing optical flow optimization processing on the first forward optical flows and the first reverse optical flows includes the following steps.

At S201, the first forward optical flows are connected to obtain a first connection optical flow, and the first reverse optical flows are connected to obtain a second connection optical flow.

In the embodiments of the present disclosure, before performing optical flow optimization, the first forward optical flows between the adjacent images are respectively connected, for example, respectively cascaded, where the first forward optical flows are connected in a depth direction to form the first connection optical flow consisting of multiple layers of first forward optical flows. Similarly, the first reverse optical flows between the adjacent images may also be respectively connected, for example, the first reverse optical flows are connected in the depth direction to form the second connection optical flow consisting of multiple layers of first reverse optical flows.

At S202, N optical flow optimization processings are respectively performed on the first connection optical flow and the second connection optical flow to obtain a first optimized optical flow corresponding to the first connection optical flow, and a second optimized optical flow corresponding to the second connection optical flow, where N is a positive integer greater than or equal to 1.

After the first connection optical flow and the second connection optical flow are obtained, optical flow optimization processings may be respectively performed on the first connection optical flow and the second connection optical flow. As described in the foregoing embodiments, in the embodiments of the present disclosure, at least one optical flow optimization process may be performed. For example, each optical flow optimization processing in the embodiments of the present disclosure may be performed by utilizing the optical flow optimization module, where the optical flow optimization module may consist of a neural network, or an optimization operation may also be performed by utilizing a corresponding algorithm. Accordingly, during the N optical flow optimization processings, N optical flow optimization network modules that are connected in sequence may be included. An input of the next optical flow optimization network module is an output of the previous optical flow optimization network module, and an output of the last optical flow optimization network module is an optimization result of the first connection optical flow and the second connection optical flow.

When one optical flow optimization network module is included, optimization processing may be performed on the first connection optical flow by utilizing the optical flow optimization module to obtain a first optimized sub-optical flow corresponding to the first connection optical flow, and optimization processing is performed on the second connection optical flow by means of the optical flow optimization module to obtain a second optimized sub-optical flow corresponding to the second connection optical flow, where the optical flow optimization processing may include residual processing and upper sampling processing, i.e., the optical flow optimization network module may further include a residual unit and an up-sampling unit. Residual processing is performed on the input first connection optical flow or second connection optical flow by means of the residual unit, where the residual unit may include a plurality of convolutional layers, and a convolution kernel used by each convolutional layer is not specifically limited in the embodiments of the present disclosure. The scale of the first connection optical flow subjected to the residual processing by means of the residual unit is decreased, for example, decreased to a quarter of the scale of the input connection optical flow, and no specific limitation is made thereto in the present disclosure, and may be set according to requirements. After the residual processing is performed, up-sampling processing is performed on the first connection optical flow or the second connection optical flow subjected to the residual processing; the scale of the output first optimized sub-optical flow may be adjusted to the scale of the first connection optical flow by means of the up-sampling processing, and the scale of the output second optimized sub-optical flow is adjusted to the scale of the second connection optical flow. Furthermore, features of multiple optical flows can be fused by means of the optical flow optimization processes, and the precision of the optical flow can be improved.

In other embodiments, the optical flow optimization module may also include a plurality of optical flow optimization network modules, such as N optical flow optimization network modules, where a first optical flow optimization network module receives the first connection optical flow and the second connection optical flow, and respectively performs the first optical flow optimization processing on the first connection optical flow and the second connection optical flow, where the first optical flow optimization processing includes the residual processing and up-sampling processing, where the specific process is the same as the foregoing embodiments, and details are not described herein again. The first optimized sub-optical flow of the first connection optical flow and the $i^{-th}$ optimized sub-optical flow of the first optimized sub-optical flow of the second connection optical flow may be obtained by means of the first optical flow optimization processing.

Furthermore, the first connection sub-optical flow and the second connection sub-optical flow are input to a second optical flow optimization network module to perform the second optical flow optimization processing, where the second optical flow optimization network module may also include a residual unit performing residual processing and an up-sampling unit performing up-sampling processing. The optical flow optimization processing may be performed on the first connection sub-optical flow and the second connection sub-optical flow by means of the second optical flow optimization network module, where the specific process is the same as the foregoing embodiments, and details are not described herein again. A second optimized sub-optical flow of the first connection optical flow and a second optimized sub-optical flow of the second connection optical flow may be obtained by means of the second optical flow optimization processing.

Similarly, one optical flow optimization process may be performed by utilizing each optical flow optimization network module, i.e., the $(i+1)^{-th}$ optical flow optimization processing may be performed on the $i^{-th}$ optimized sub-optical flow of the first connection optical flow and the $i^{-th}$ optimized sub-optical flow of the second connection optical flow by utilizing the $(i+1)^{-th}$ optical flow optimization network module to obtain the $(i+1)^{-th}$ optimized sub-optical flow corresponding to the first connection optical flow, and the $(i+1)^{-th}$ optimized sub-optical flow corresponding to the second connection optical flow, where i is a positive integer greater than 1 and less than N. Finally, an $N^{-th}$ optimized sub-optical flow of the first connection optical flow and the $N^{-th}$ optimized sub-optical flow of the second connection optical flow may be obtained by means of the $N^{-th}$ optimization processing performed by the $N^{-th}$ optical flow optimization network module. Furthermore, the obtained $N^{-th}$ optimized sub-optical flow of the first connection optical flow may be determined as the first optimized optical flow, and the obtained $N^{-th}$ optimized sub-optical flow of the second connection optical flow may be determined as the second optimized optical flow. In the embodiments of the present disclosure, the optical flow optimization process performed by each optical flow optimization network module may include residual processing and up-sampling processing, i.e., all the optical flow optimization network modules may be the same.

Figure 4:
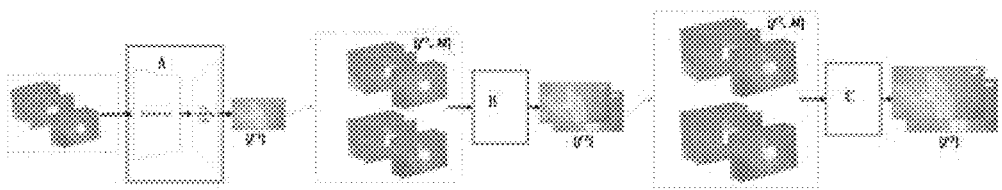
FIG. 4 shows a schematic structural diagram of an optical flow optimization network according to the embodiments of the present disclosure.

For example, FIG. 4 shows a schematic structural diagram of an optical flow optimization network according to the embodiments of the present disclosure, where three optical flow optimization network modules, A, B, and C, may be included. The three optical flow optimization network modules may each consist of a residual unit and an up-sampling unit. The first optical flow optimization processing of a first connection optical flow $f^0$ and a second connection optical flow $f^1$ may be performed by means of the first optical flow optimization network module A to obtain a first connection sub-optical flow $f^1$ of the first connection optical flow and a first connection optical flow $f^{1'}$ of the second connection optical flow. The first connection optical flows $f^1$ and $f^{1'}$ are respectively input to the second optical flow optimization network module B to perform the second optical flow optimization processing, to obtain a second connection sub-optical flow $f^2$ of the first connection optical flow and a second connection sub-optical flow $f^{2'}$ of the second connection optical flow. Furthermore, the second connection sub-optical flows $f^2$ and $f^{2'}$ are respectively input to the third optical flow optimization network module C to respectively perform the third optical flow optimization processing, to obtain a third optimized optical flow $f^3$ corresponding to the first connection optical flow and a third optimized optical flow $f^{3'}$ corresponding to the second connection optical flow. In this case, a third optimized sub-optical flow of the first connection optical flow obtained by the last optical flow optimization processing may be determined as the first optimized optical flow, and a third optimized sub-optical flow of the second connection optical flow obtained by the last optical flow optimization processing may be determined as the second optimized optical flow.

At S203, a second forward optical flow corresponding to each first forward optical flow is obtained according to the first optimized optical flow, and a second reverse optical flow corresponding to each first reverse optical flow is obtained according to the second optimized optical flow.

After N optical flow optimization processings are performed, the scale of the first optimized optical flow is the same as that of the first connection optical flow, and the first optimized optical flow may be divided into G second forward optical flows in the depth direction, where the G second forward optical flows respectively correspond to optimization results of the first forward optical flows. Similarly, after N optical flow optimization processings are performed, the scale of the second optimized optical flow is the same as that of the second connection optical flow, and the second optimized optical flow may be divided into G second reverse optical flows in the depth direction, where the G second reverse optical flows respectively correspond to optimization results of the first reverse optical flow.

By means of the foregoing embodiments, the second forward optical flows after the optimization of the first forward optical flows between the images, and the second reverse optical flows after the optimization of the first reverse optical flows between the images may be obtained. The accuracy of video repair can be implemented by performing optimization on the optical flows.

After obtaining the optimized optical flows, forward guiding and reverse guiding of multiple frames of images may be respectively performed by utilizing the optimized second forward optical flows and second reverse optical flows to obtain a final repaired image. The forward guiding and reverse guiding processes are respectively described below.

Figure 5:
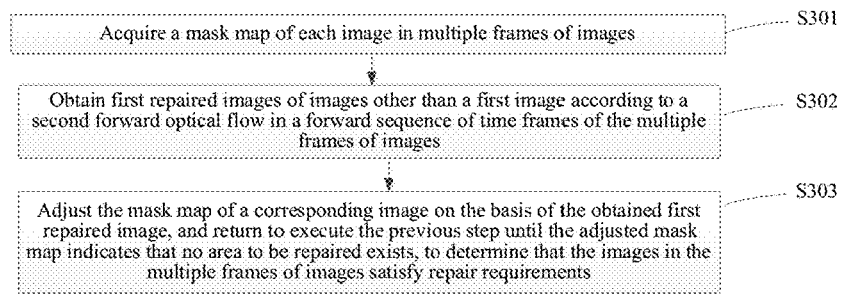
FIG. 5 shows a flowchart of step S300 of a video repair method according to the embodiments of the present disclosure.

FIG. 5 shows a flowchart of step S300 of a video repair method according to the embodiments of the present disclosure. Performing the forward conduction optimization on the continuous multiple frames of images by utilizing the second forward optical flows includes the following steps.

At S301, the mask map of each image among the multiple frames of images is acquired, where the mask map represents the area to be repaired of the corresponding image.

As described above, in the embodiments of the present disclosure, each image may correspond to a mask map which is used for representing an area to be repaired that needs to be repaired in the corresponding image. A corresponding mask of pixel points in the area may be 1, and the mask of the remaining areas may be 0, or the mask of the pixel points in the area to be repaired may be 0, and the mask of the pixel points in the remaining areas may be 1. No specific limitation is made thereto in the present disclosure.

At S302, first repaired images of images other than a first image are obtained according to the second forward optical flows in the forward sequence of the time frames of the multiple frames of images.

In the embodiments of the present disclosure, the obtained second forward optical flow represents an optical flow between two adjacent images in the forward sequence of the time frames, i.e., an optical flow from the previous image to the next image. Therefore, guiding may be performed on the image according to the obtained second forward optical flow, i.e., a new image of each image obtained under a condition of an optical flow change of the corresponding second forward optical flow is obtained, where the new image is a first repaired image of the next image.

Figure 6:
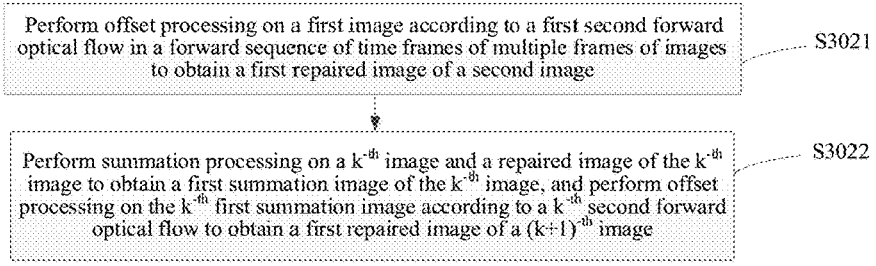
FIG. 6 shows a flowchart of step S302 of a video repair method according to the embodiments of the present disclosure.

FIG. 6 shows a flowchart of step S302 of a video repair method according to the embodiments of the present disclosure. In the embodiments of the present disclosure, obtaining a first repaired image of each image according to the second forward optical flows in the forward sequence of the time frames of the multiple frames of images may include the following steps.

At S3021, offset processing is performed on the first image according to the first second forward optical flow in the forward sequence of the time frames of the multiple frames of images to obtain a first repaired image of a second image.

At S3022, summation processing is performed on the $k^{-th}$ image and a repaired image of the $k^{-th}$ image to obtain a first summation image of the $k^{-th}$ image, and offset processing is performed on the $k^{-th}$ first summation image according to the $k^{-th}$ second forward optical flow to obtain a first repaired image of the $(k+1)^{-th}$ image, where k is a positive integer greater than 1 and less than G, and G represents the number of images among the multiple frames of images.

In the forward sequence of the time frames, the second forward optical flow may be represented as $\{f_{1 \to 2}, f_{2 \to 3}, \ldots, f_{G-1 \to G}\}$, where $f_{i-1 \to i}$ represents a second forward optical flow between the $(i-1)^{-th}$ image $P_{i-1}$ and the $i^{-th}$ image $P_i$, and i is an integer greater than 1 and less than or equal to G. Accordingly, the second reverse optical flow may be represented as $\{f_{G \to G-1}, f_{G-2 \to G-3}, \ldots, f_{2 \to 1}\}$, where $f'_{j+1 \to j}$ represents a second reverse optical flow between the $(j+1)^{-th}$ image $P_{j+1}$ and the $j^{-th}$ image $P_j$, where j is an integer greater than or equal to 1 and less than G.

Accordingly, offset processing may be performed on the first image $P_1$ according to an optical flow change of the first second forward optical flow $f'_{1 \to 2}$ to obtain a new image $P'_2$, where $P'_2$ may be a first repaired image of the second image $P_2$. Then, addition processing may be performed on the second image $P_2$ and the first repaired image $P'_2$ thereof, for example, elements are correspondingly added, to obtain a first summation map of the second image $P_2$. By means of the summation processing, the repair of an area to be repaired of the second image may be implemented by utilizing the optimized second forward optical flow, for example, supplementing a corresponding pixel value, or adjusting a pixel value, etc.

Furthermore, offset processing may be performed on a first summation image of the second image $P_1$ by utilizing an optical flow change of the second second forward optical flow $f'_{2 \to 3}$ to obtain a new image $P'_3$, where $P'_3$ may be a first repaired image of the third image $P_3$. Then, addition processing may be performed on the third image $P_3$ and the first repaired image $P'_3$ thereof, for example, elements are correspondingly added, to obtain a first summation map of the third image $P_3$. By means of the summation processing, the repair of an area to be repaired of the third image may be implemented by utilizing the optimized second forward optical flow, for example, supplementing a corresponding pixel value, or adjusting a pixel value, etc.

Similarly, offset processing may be performed on a first summation image of the $k^{-th}$ image $P_k$ by utilizing an optical flow change of a second $k^{-th}$ second forward optical flow $f'_{k \to k+1}$ to obtain a new image $P'_k$, where $P'_k$ may be a first repaired image of the $k^{-th}$ image $P_k$. Then, addition processing may be performed on the $k^{-th}$ image $P_k$ and the first repaired image $P'_k$ thereof, for example, elements are correspondingly added, to obtain a first summation map of the $(k+1)^{-th}$ image $P_{k+1}$. By means of the summation processing, the repair of an area to be repaired of the $k^{-th}$ image may be implemented by utilizing the optimized second forward optical flow, for example, supplementing a corresponding pixel value, or adjusting a pixel value, etc.

By means of the foregoing embodiments, the first repaired image of each image may be obtained, where some pixel values of the area to be repaired in the first repaired image may be supplemented (i.e., repaired).

At S303, the mask map of the corresponding image is adjusted on the basis of an obtained first repaired image, and return to execute the previous step until the adjusted mask map indicates that no area to be repaired exists, to determine that the images among the multiple frames of images satisfy the repair requirements.

As described in the foregoing embodiments, after the first repaired image of the image is obtained, if a certain pixel point in the area to be repaired in the first repaired image of the $k^{-th}$ image is repaired, i.e., a pixel value is repaired, a mask value of the corresponding pixel point in the mask map of the $k^{-th}$ image may be reset, for example, if an original mask value is 1, the mask value is adjusted to 0, and vice versa.

After the mask map of the image is adjusted, step S302 may be repeatedly executed on the obtained first repaired image until no area to be repaired exists in the mask map corresponding to each image, and in this case, a forward guiding process of the image is completed, i.e., the first optimized image of each image may be obtained.

Figure 7:
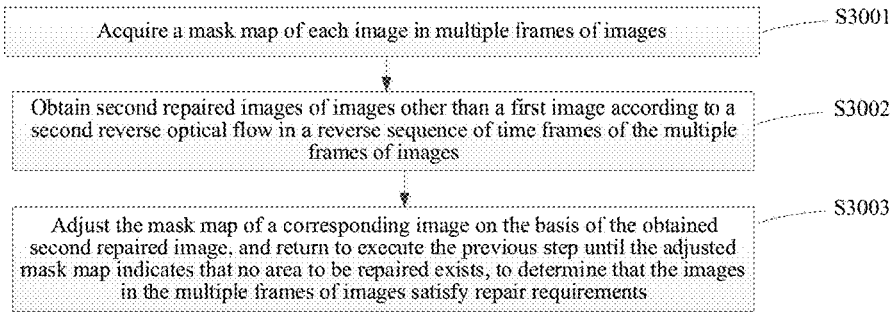
FIG. 7 shows a flowchart of step S300 of a video repair method according to the embodiments of the present disclosure.

FIG. 7 shows a flowchart of step S300 of a video repair method according to the embodiments of the present disclosure. Performing the reverse conduction optimization on the continuous multiple frames of images by utilizing the second reverse optical flows may include the following steps.

At S3001, the mask map of each image among the multiple frames of images is acquired, where the mask map represents the area to be repaired of the corresponding image.

The process is the same as step S301, and details are not described herein again.

At S3002, second repaired images of the images other than the first image are obtained according to the second reverse optical flows in the reverse sequence of the time frames of the multiple frames of images.

In the embodiments of the present disclosure, the obtained second reverse optical flow represents an optical flow between two adjacent images in the reverse sequence of the time frames, i.e., an optical flow from the next image to the previous image. Therefore, reverse guiding may be performed on the images according to the obtained second reverse optical flows, i.e., a new image of each image obtained under a condition of an optical flow change of the corresponding second reverse optical flow is obtained, where the new image is a first repaired image of the next image.

Figure 8:
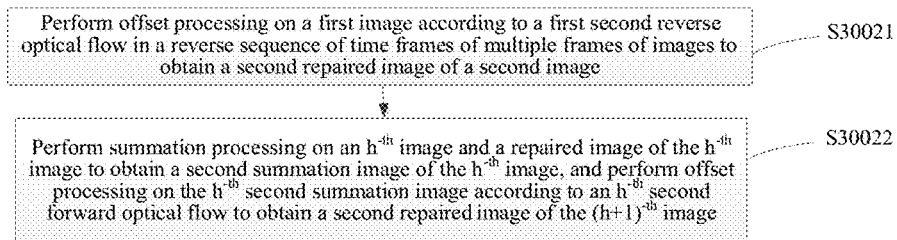
FIG. 8 shows a flowchart of step S3002 of a video repair method according to the embodiments of the present disclosure.

FIG. 8 shows a flowchart of step S3002 of a video repair method according to the embodiments of the present disclosure. In the embodiments of the present disclosure, where obtaining the second repaired image of each image according to the second reverse optical flows in the reverse sequence of the time frames of the multiple frames of images may include the following steps.

At S30021, offset processing is performed on the first image according to the first second reverse optical flow in the reverse sequence of the time frames of the multiple frames of images to obtain a second repaired image of a second image.

At S30022, summation processing is performed on the $h^{-th}$ image and a repaired image of the $h^{-th}$ image to obtain a second summation image of the $h^{-th}$ image, and offset processing is performed on the $h^{-th}$ second summation image according to the $h^{-th}$ second reverse optical flow to obtain a second repaired image of the $(h+1)^{-th}$ image, where h is a positive integer greater than 1 and less than or equal to G, and G represents the number of images among the multiple frames of images.

It should be noted here that, in the embodiments of the present disclosure, the images may be represented as $\{P_1, P_2, \ldots, P_k\}$ in the forward sequence of the time frames, and accordingly, the images may be represented as $\{P_G, P_{G-1}, \ldots, P_1\}$ in the reverse sequence of the time frames. Furthermore, the first image in the reverse sequence may be $P_G$, the corresponding second image may be $P_{G-1}$, and in a similar fashion, the $G^{-th}$ image is $P_1$.

Furthermore, in the reverse sequence of the time frames, the second reverse optical flows may be represented as $\{f_{1 \to 2}, f_{2 \to 3}, \ldots, f_{G-1 \to G}\}$, where $f_{i-1 \to i}$ represents the second forward optical flow between the $(i-1)^{-th}$ image $P_{i-1}$ and the $i^{-th}$ image $P_i$, and i is an integer greater than 1 and less than or equal to G. Accordingly, the second reverse optical flows may be represented as $\{f_{G \to G-1}, f_{G-1 \to G-2}, \ldots, f_{2 \to 1}\}$, where $f_{j+1 \to i}$ represents the second reverse optical flow between the $(j+1)^{-th}$ image $P_{j+1}$ and the $j^{-th}$ image i, where j is an integer greater than or equal to 1 and less than G.

At step S30021, offset processing may be performed on the first image $P_G$ in the reverse sequence according to an optical flow change of a first second reverse optical flow $f'_{G \to G-1}$ to obtain a new image $P''_{G-1}$, where $P''_{G-1}$ may be the second repaired image of the second image $P_{G-1}$ in the reverse sequence. Then, addition processing may be performed on the second image $P_{G-1}$ in the reverse sequence and the second repaired image $P''_{G-1}$ thereof, for example, elements are correspondingly added, to obtain a second summation map of the second image $P_{G-1}$. By means of the summation processing, the repair of the area to be repaired of the second-to-last image may be implemented by utilizing the optimized second reverse optical flow, for example, supplementing a corresponding pixel value, or adjusting a pixel value, etc.

Furthermore, offset processing may be performed on the second summation image of the second image $P_{G-1}$ in the reverse sequence by utilizing an optical flow change of the second second reverse optical flow $f'_{G-1 \to G-2}$ to obtain a new image $P''_{G-2}$, where $P''_{G-2}$ may be a second repaired image of the third image $P_{G-2}$ in the reverse sequence. Then, addition processing may be performed on the third image $P_{G-2}$ in the reverse sequence and the first repaired image $P'_{G-2}$ thereof, for example, elements are correspondingly added, to obtain a first summation map of the third image $P_{G-2}$ in the reverse sequence. By means of the summation processing, the repair of the area to be repaired of the third-to-last image may be implemented by utilizing the optimized second reverse optical flow, for example, supplementing a corresponding pixel value, or adjusting a pixel value, etc.

Similarly, offset processing may be performed on the second summation image of the $h^{-th}$ image $P_{G-h+1}$ in the reverse sequence by utilizing an optical flow change of the $h^{-th}$ second reverse optical flow $f_{h+1 \to h}$ to obtain a new image $P''_{G-h}$, where $P''_{G-h}$ may be a second repaired image of the $(h+1)^{-th}$ image $P_{G-h}$ in the reverse sequence. Then, addition processing may be performed on the $(h+1)^{-th}$ image $P_{G-h}$ in the reverse sequence and the second repaired image $P''_{G-h}$ thereof, for example, elements are correspondingly added, to obtain a first summation map of the $(h+1)^{-th}$ image $P_{G-h}$ in the reverse sequence. By means of the summation processing, the repair of the area to be repaired of the $(h+1)^{-th}$-to-last image may be implemented by utilizing the optimized second reverse optical flow, for example, supplementing a corresponding pixel value, or adjusting a pixel value, etc.

By means of the foregoing embodiments, the second repaired image of each image may be obtained, where some pixel values of the area to be repaired in the second repaired image may be supplemented (i.e., repaired).

At S3003, the mask map of the corresponding image is adjusted on the basis of the obtained second repaired image, and return to execute the previous step until the adjusted mask map indicates that no area to be repaired exists, to determine that the images among the multiple frames of images satisfy the repair requirements.

As described in the foregoing embodiments, after the second repaired image of the image is obtained, if a certain pixel point in the area to be repaired in the second repaired image of the $k^{-th}$ image is repaired, i.e., a pixel value is repaired, a mask value of the corresponding pixel point in the mask map of the $k^{-th}$ image may be reset, for example, if an original mask value is 1, the mask value is adjusted to 0, and vice versa.

After the mask map of the image is adjusted, step S3002 may be repeatedly executed on the obtained second repaired image until no area to be repaired exists in the mask map corresponding to each image, and in this case, a reverse guiding process of the image is completed, i.e., the second optimized image of each image may be obtained.

Figure 9:
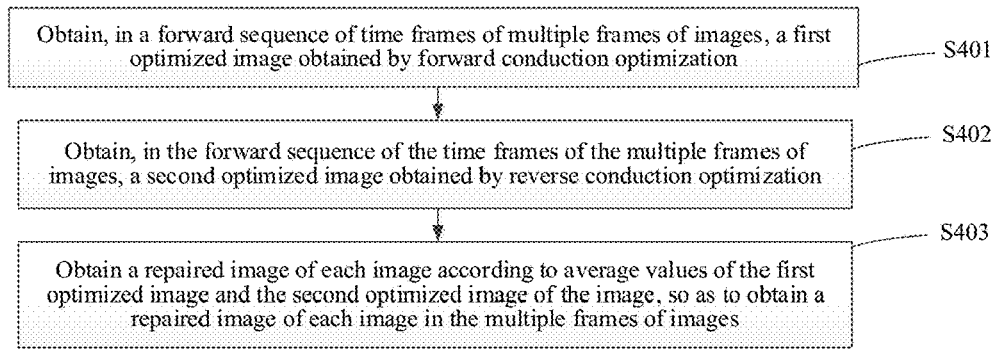
FIG. 9 shows a flowchart of step S400 of a video repair method according to the embodiments of the present disclosure.

Step S400 may be executed after the first optimized images and the second optimized images of the images among the multiple frames of images are obtained. FIG. 9 shows a flowchart of step S400 of a video repair method according to the embodiments of the present disclosure. Obtaining the repaired images of the continuous multiple frames of images according to the optimized images obtained by the forward conduction optimization and the reverse conduction optimization may include the following steps.

At S401, a first optimized image obtained by the forward conduction optimization is obtained in the forward sequence of the time frames of the multiple frames of images.

At S402, a second optimized image obtained by the reverse conduction optimization is obtained in the forward sequence of the time frames of the multiple frames of images.

At S403, a repaired image of each image is obtained according to average values of the first optimized image and the second optimized image of the image, so as to obtain the repaired image of each image among the multiple frames of images.

As described in the foregoing embodiments, the first repaired image of the image when forward guiding is ended may be taken as the first optimized image, and the second repaired image of the image when reverse guiding is ended is taken as the second optimized image.

After the corresponding first optimized image and second optimized image of the image are obtained, averaging processing may be performed on the first optimized image and the second optimized image, i.e., average values of the pixel values of the same pixel points are obtained, to obtain a final repaired image. In this way, the repaired image having higher accuracy can be obtained by combining results of the optimized images obtained in forward guiding and reverse guiding directions. In addition, the embodiments of the present disclosure may implement complete repair of the pixel points of the image by adjusting the mask and repeatedly performing the forward guiding and reverse guiding processes.

In addition, the embodiments of the present disclosure further provide a process for training an optical flow optimization network performing optical flow optimization processings, where as described in the foregoing embodiments, the optical flow optimization network may include N optical flow optimization network modules, the optical flow optimization network modules in the embodiments of the present disclosure may be the same, and corresponding training modes may be the same. Description is made below by means of a process for training one optical flow optimization network module.

Figure 10:
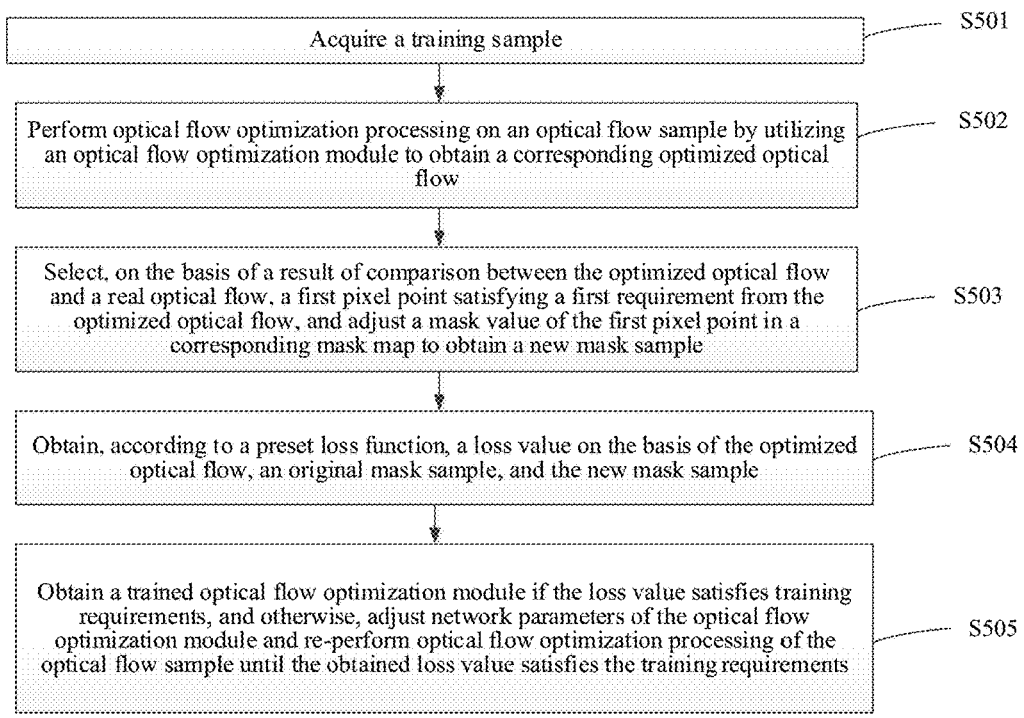
FIG. 10 shows a flowchart of a method for training an optical flow optimization module according to the embodiments of the present disclosure.

FIG. 10 shows a flowchart of a method for training an optical flow optimization module according to the embodiments of the present disclosure. The step of training each optical flow optimization network module in the optical flow optimization module may include the following steps.

At S501, a training sample is acquired, where the training sample includes multiple groups of optical flow samples, and a mask sample and a real optical flow corresponding to each group of optical flow samples.

The training sample used for training the optical flow optimization network module in the embodiments of the present disclosure may include multiple groups of optical flow samples, where each group of optical flow samples are the forward optical flow and/or the reverse optical flow between adjacent images in corresponding multiple frames of images samples. In addition, the training sample further includes corresponding mask samples of each group of optical flow samples, where the mask samples are the mask maps corresponding to the image samples. In addition, the training sample may further include the real optical flow corresponding to the optical flow sample, i.e., the real optical flow between image samples.

At S502, optical flow optimization processing is performed on the optical flow sample by utilizing the optical flow optimization module to obtain a corresponding optimized optical flow.

Optimization is performed on groups of optical flow samples by means of an initial optical flow network module in the embodiments of the present disclosure, the specific optimization process is the same as the description of step S200, and description is not made herein repeatedly. The optimized optical flow corresponding to each optical flow sample may be obtained by means of the process.

At S503, a first pixel point satisfying a first requirement is selected from the optimized optical flow on the basis of a result of comparison between the optimized optical flow and the real optical flow, and a mask value of the first pixel point in the mask map is adjusted to obtain a new mask sample.

After the optimized optical flow of the optical flow sample is obtained, in the embodiments of the present disclosure, optical flow differences corresponding to pixel points in the optimized optical flow and the corresponding real optical flow may be acquired, and the first pixel point satisfying the first requirement is selected from the pixel points, for example, the optical flow differences of the pixel points are arranged in a descending order, and a pixel point having a large optical flow difference at a preset ratio (such as 50%) is selected from the pixel points and taken as the first pixel point satisfying the first requirement. Alternatively, in other embodiments, the preset ratio may be another value, and no specific limitation is made thereto in the present disclosure.

After the first pixel point satisfying the first requirement is determined, the mask value of the first pixel point in the mask map corresponding to the optimized optical flow may be determined as the mask value corresponding to the area to be repaired. That is, in the obtained optimized optical flow, if optical flow values of some pixel points have a large error, the mask value of the corresponding pixel points in the corresponding mask map is reset to a mask value (such as 1) represented by the area to be repaired, so that a new mask map may be obtained.

At S504, according to a preset loss function, a loss value is obtained on the basis of the optimized optical flow, an original mask sample, and the new mask sample, where the expression of the preset loss function may be as shown in formula (1):

$$L = \frac{\|M \odot (f - \hat{f})\|_1}{\|M\|_1} + \lambda * \frac{\|M^h \odot (f - \hat{f})\|_1}{\|M\|_1}; \quad \text{Formula (1)}$$

where L represents the loss function of optical flow optimization processing, M is an original mask sample, $M^h$ represents a new mask sample, f represents an obtained optimized optical flow, $\hat{f}$ represents a real optical flow, and $\lambda$ is a weight.

In the embodiments of the present disclosure, the loss value of the optimization process may be obtained according to the loss function.

At S505, a trained optical flow optimization module is obtained if the loss value satisfies training requirements, and otherwise, network parameters of the optical flow optimization module are adjusted and optical flow optimization processing of the optical flow sample is re-performed until the obtained loss value satisfies the training requirements.

For example, it can be determined that the loss value satisfies the training requirements only when the obtained loss value is less than a loss threshold value, and in this case, training may be terminated, and otherwise, parameters of the network module are adjusted until the obtained loss value satisfies the training requirements.

In summary, according to the embodiments of the present disclosure, repair processing can be performed on video images of multiple continuous time frames simultaneously, where first, optimization is performed on forward optical flows and reverse optical flows between adjacent frame images to obtain optical flows having relatively high precision, and then guiding is performed on video repair by means of the optimized forward optical flows and reverse optical flows. Thus, the accuracy of the video repair can be improved, and the continuity and consistency among frames can also be improved. In addition, according to the embodiments of the present disclosure, a high repair speed is achieved, and the real-time property of repair may be satisfied.

Furthermore, at present, a current conventional method cannot deal with the situation of lack of complex motion information existing in an area. Once there is a lack of complex detailed information such as a shape existing in the missing area, the conventional method cannot achieve video repair well. However, in the embodiments of the present disclosure, a video image may still be repaired well even under the situation of lack of complex details.

A person skilled in the art may understand that, in the foregoing method of the specific implementations, the order in which the steps are written does not imply a strict execution order which constitutes any limitation to the implementation process, and the specific order of executing the steps should be determined by functions and possible internal logics thereof.

It may be understood that the foregoing various method embodiments mentioned in the present disclosure may be combined with each other to form a combined embodiment without departing from the principle logic. Details are not described herein again due to space limitation.

In addition, the present disclosure further provides a video repair apparatus, an electronic device, a computer-readable storage medium, and a program, which can all be configured to implement any of the video repair methods provided by the present disclosure. For the corresponding technical solutions and descriptions, please refer to the corresponding content in the method section. Details are not described herein again.

Figure 11:
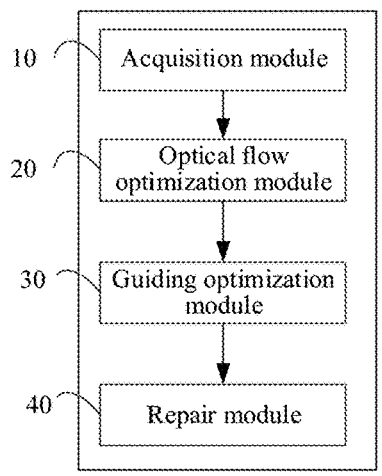
FIG. 11 shows a block diagram of a video repair apparatus according to the embodiments of the present disclosure.

FIG. 11 is a block diagram of a video repair apparatus according to the embodiments of the present disclosure. As shown in FIG. 11, the video repair apparatus includes:

an acquisition module 10 configured to acquire first forward optical flows and first reverse optical flows between adjacent images among continuous multiple frames of images; an optical flow optimization module 20 configured to respectively perform optical flow optimization processing on the first forward optical flows and the first reverse optical flows to obtain second forward optical flows corresponding to the first forward optical flows and second reverse optical flows corresponding to the first reverse optical flows; a conduction optimization module 30 configured to perform forward conduction optimization on the continuous multiple frames of images by utilizing the second forward optical flows, and to perform reverse conduction optimization on the continuous multiple frames of images by utilizing the second reverse optical flows until all the images in the optimized continuous multiple frames of images satisfy repair requirements; and a repair module 40 configured to obtain repaired images of the continuous multiple frames of images according to the optimized images obtained by the forward conduction optimization and the reverse conduction optimization.

In some possible implementations, the acquisition module is further configured to acquire a mask map of each image among the multiple frames of images, to determine forward optical flows between the adjacent images in a forward sequence of time frames of the multiple frames of images, and to determine reverse optical flows between the adjacent images in a reverse sequence of the time frames of the multiple frames of images; and to multiply a forward optical flow between the $i^{-th}$ image and the $(i+1)^{-th}$ image by a mask map of the $(i+1)^{-th}$ image to obtain a first forward optical flow between the $i^{-th}$ image and the $(i+1)^{-th}$ image, and to multiply a reverse optical flow between the $(i+1)^{-th}$ image and the $i^{-th}$ image with a mask map of the $i^{-th}$ image to obtain a first reverse optical flow between the $(i+1)^{-th}$ image and the $i^{-th}$ image, where the mask map represents an area to be repaired of a corresponding image, i is a positive integer greater than or equal to 1 and less than G, and G is the number of images among the multiple frames of images.

In some possible implementations, the optical flow optimization module is further configured to connect the first forward optical flows to obtain a first connection optical flow, and to connect the first reverse optical flows to obtain a second connection optical flow, to respectively perform N optical flow optimization processings on the first connection optical flow and the second connection optical flow to obtain a first optimized optical flow corresponding to the first connection optical flow, and a second optimized optical flow corresponding to the second connection optical flow, where N is a positive integer greater than or equal to 1; and to obtain a second forward optical flow corresponding to each first forward optical flow according to the first optimized optical flow, and to obtain a second reverse optical flow corresponding to each first reverse optical flow according to the second optimized optical flow.

In some possible implementations, the optical flow optimization module is further configured to perform the first optical flow optimization processing on the first connection optical flow and the second connection optical flow to obtain a first optimized sub-optical flow corresponding to the first connection optical flow, and a first optimized sub-optical flow corresponding to the second connection optical flow; and to respectively perform the $(i+1)^{-th}$ optical flow optimization processing on the $i^{-th}$ optimized sub-optical flow of the first connection optical flow and the $i^{-th}$ optimized sub-optical flow of the second connection optical flow to obtain the $(i+1)^{-th}$ optimized sub-optical flow corresponding to the first connection optical flow, and the $(i+1)^{-th}$ optimized sub-optical flow corresponding to the second connection optical flow, where i is a positive integer greater than 1 and less than N; where by means of the $N^{-th}$ optimization processing, the obtained $N^{-th}$ optimized sub-optical flow of the first connection optical flow is determined as the first optimized optical flow, and the obtained $N^{-th}$ optimized sub-optical flow of the second connection optical flow is determined as the second optimized optical flow, where each optical flow optimization processing includes residual processing and up-sampling processing.

In some possible implementations, the conduction optimization module includes a first conduction optimization unit configured to acquire the mask map of each image among the multiple frames of images, where the mask map represents the area to be repaired of the corresponding image; to obtain first repaired images of images other than a first image according to the second forward optical flows in the forward sequence of the time frames of the multiple frames of images; and to adjust the mask map of the corresponding image on the basis of the obtained first repaired image, and return to execute the previous step until the adjusted mask map indicates that no area to be repaired exists, to determine that the images among the multiple frames of images satisfy the repair requirements.

In some possible implementations, the first conduction optimization unit is further configured to perform offset processing on the first image according to the first second forward optical flow in the forward sequence of the time frames of the multiple frames of images to obtain the first repaired image of a second image; and to perform summation processing on the $k^{-th}$ image and a repaired image of the $k^{-th}$ image to obtain a first summation image of the $k^{-th}$ image, and to perform offset processing on the $k^{-th}$ first summation image according to the $k^{-th}$ second forward optical flow to obtain a first repaired image of the $(k+1)^{-th}$ image, where k is a positive integer greater than 1 and less than G, and G represents the number of images among the multiple frames of images.

In some possible implementations, the conduction optimization module further includes a second conduction optimization unit configured to acquire the mask map of each image among the multiple frames of images, where the mask map represents the area to be repaired of the corresponding image; to obtain second repaired images of the images other than the first image according to the second reverse optical flows in the reverse sequence of the time frames of the multiple frames of images; and to adjust the mask map of the corresponding image on the basis of the obtained second repaired image, and return to execute the previous step until the adjusted mask map indicates that no area to be repaired exists, to determine that the images among the multiple frames of images satisfy the repair requirements.

In some possible implementations, the second conduction optimization unit is further configured to perform offset processing on the first image according to the first second reverse optical flow in the reverse sequence of the time frames of the multiple frames of images to obtain a second repaired image of the second image; and to perform summation processing on the $h^{-th}$ image and a repaired image of the $h^{-th}$ image to obtain a second summation image of the $h^{-th}$ image, and to perform offset processing on the $h^{-th}$ second summation image according to the $h^{-th}$ second reverse optical flow to obtain a second repaired image of the $(h+1)^{-th}$ image, where h is a positive integer greater than 1 and less than or equal to G, and G represents the number of images among the multiple frames of images.

In some possible implementations, the repair module is further configured to obtain, in the forward sequence of the time frames of the multiple frames of images, a first optimized image obtained by the forward conduction optimization, and to obtain, in the forward sequence of the time frames of the multiple frames of images, a second optimized image obtained by the reverse conduction optimization; and to obtain a repaired image of each image according to average values of a first optimized image and a second optimized image of the image, so as to obtain the repaired image of each image among the multiple frames of images.

In some possible implementations, the apparatus further includes a training module configured to train the optical flow optimization module and configured to input a training sample to the optical flow optimization module, where the training sample includes multiple groups of optical flow samples, and a mask sample and a real optical flow corresponding to each optical flow sample; to perform optical flow optimization processing on the optical flow sample by utilizing the optical flow optimization module to obtain a corresponding optimized optical flow; to select, on the basis of a result of comparison between the optimized optical flow and the real optical flow, a first pixel point satisfying a first requirement from the optimized optical flow, and to adjust a mask value of the first pixel point in the mask map to obtain a new mask sample; to obtain, according to a preset loss function, a loss value on the basis of the optimized optical flow, an original mask sample, and the new mask sample; and to obtain a trained optical flow optimization module if the loss value satisfies training requirements, and otherwise, to adjust network parameters of the optical flow optimization module and re-perform optical flow optimization processing of the optical flow sample until the obtained loss value satisfies the training requirements.

In some possible implementations, the expression of the preset loss function is:

$$L = \frac{\|M \odot (f - \hat{f})\|_1}{\|M\|_1} + \lambda * \frac{\|M^h \odot (f - \hat{f})\|_1}{\|M\|_1};$$

where L represents a loss function of optical flow optimization processing, M is an original mask sample, $M^h$ represents a new mask sample, f represents an obtained optimized optical flow, $\hat{f}$ represents a real optical flow, and $\lambda$ is a weight.

In some embodiments, the functions provided by or the modules included in the apparatus provided by the embodiments of the present disclosure may be used for implementing the method described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where when the computer program instructions are executed by a processor, the foregoing method is implemented. The computer-readable storage medium may be a volatile or non-volatile computer-readable storage medium.

The embodiments of the present disclosure further provide an electronic device, including: a processor; and a memory configured to store processor-executable instructions, where the processor is configured to implement the foregoing method. The electronic device may be provided as a terminal, a server, or a device in another form.

Figure 12:
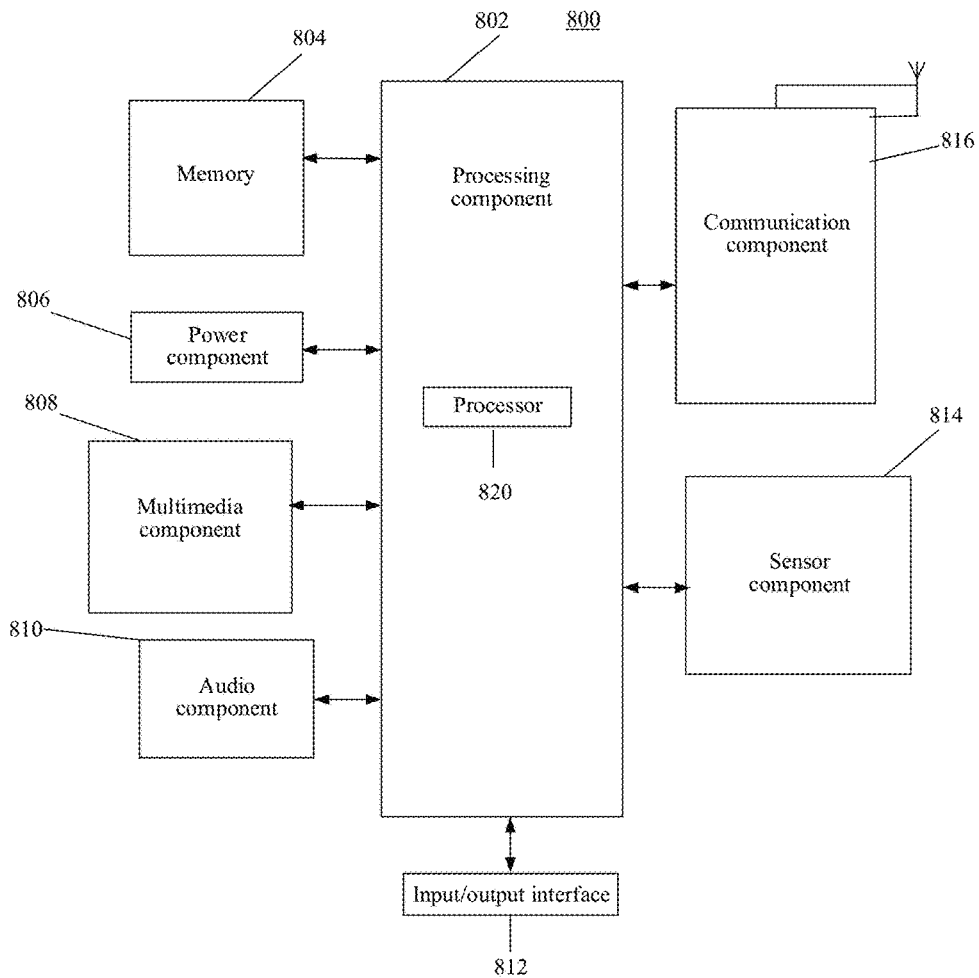
FIG. 12 shows a block diagram of an electronic device 800 according to the embodiments of the present disclosure.

FIG. 12 shows a block diagram of an electronic device 800 according to the embodiments of the present disclosure.

For example, an electronic device 800 may be a terminal such as a mobile phone, a computer, a digital broadcast terminal, a message transceiver device, a game console, a tablet device, a medical device, exercise equipment, and a personal digital assistant.

Referring to FIG. 12, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application program or method operated on the electronic device 800, contact data, contact list data, messages, pictures, videos, etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to implement the method above.

In an exemplary embodiment, further provided is a non-volatile computer-readable storage medium, for example, a memory 804 including computer program instructions, which can executed by the processor 820 of the electronic device 800 to implement the method above.

Figure 13:
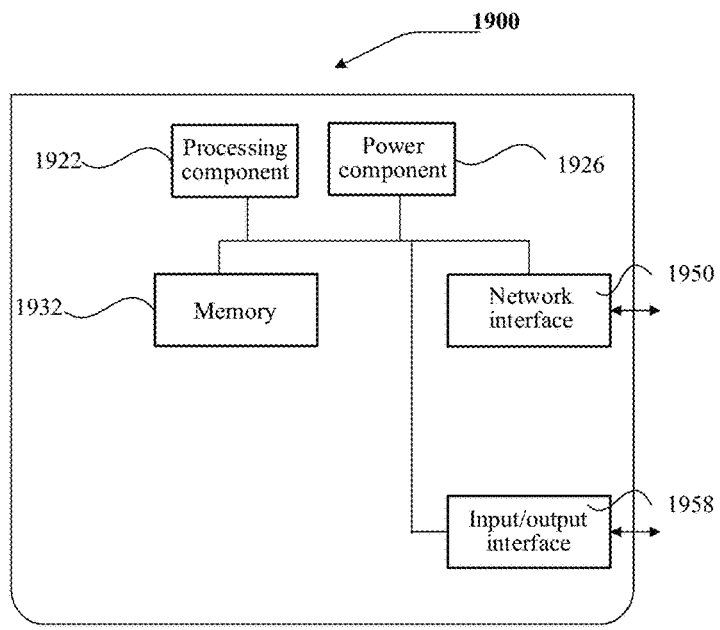
FIG. 13 shows a block diagram of an electronic device 1900 according to the embodiments of the present disclosure.

FIG. 13 shows a block diagram of an electronic device 1900 according to the embodiments of the present disclosure. For example, an electronic device 1900 may be provided as a server. Referring to FIG. 13, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to implement the method above.

The electronic device 1900 may further include a power component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, further provided is a non-volatile computer-readable storage medium, for example, a memory 1932 including computer program instructions, which can executed by the processing component 1922 of the electronic device 1900 to implement the method above.

The present disclosure may be a system, a method, and/or a computer program product. The computer program product may include a computer-readable storage medium having computer-readable program instructions thereon for causing a processor to carry out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer-readable storage medium include: a portable computer diskette, a hard disk, a Random Access Memory (RAM), an ROM, an EPROM (or a flash memory), an SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer-readable storage medium used herein is not to be construed as being a transitory signal per se, such as a radio wave or other freely propagating electromagnetic waves, an electromagnetic wave propagating through a waveguide or other transmission media (e.g., a light pulse passing through a fiber-optic cable), or an electrical signal transmitted through a wire.

The computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may include a copper transmission cable, an optical transmission fiber, wireless transmission, a router, a firewall, a switch, a gateway computer and/or an edge server. A network adapter card or network interface in each computing/processing device receives computer-readable program instructions from the network and forwards the computer-readable program instructions for storage in a computer-readable storage medium within the respective computing/processing device.

The computer program instructions for carrying out operations of the present disclosure may be assembler instructions, Instruction-Set-Architecture (ISA) instructions, machine instructions, machine dependent instructions, a microcode, firmware instructions, state-setting data, or either source code or object code written in any combination of one or more programming languages, including an object oriented programming language such as Smalltalk, C++ or the like, and a conventional procedural programming language, such as the "C" programming language or a similar programming language. The computer-readable program instructions may be executed entirely on the user's computer, partly on the user's computer, as a stand-alone software package, partly on the user's computer and partly on a remote computer or entirely on the remote computer or server. In a scenario involving a remote computer, the remote computer may be connected to the user's computer via any type of network, including a LAN or a WAN, or the connection may be made to an external computer (for example, via the Internet using an Internet service provider). In some embodiments, electronic circuitry including, for example, programmable logic circuitry, a Field-Programmable Gate Array (FPGA), or a Programmable Logic Array (PLA) may execute the computer-readable program instructions by utilizing state information of the computer-readable program instructions to personalize the electronic circuitry, so as to implement the aspects of the present disclosure.

The aspects of the present disclosure are described herein with reference to flowcharts and/or block diagrams of the method, apparatus (system), and computer program product according to the embodiments of the present disclosure. It should be understood that each block of the flowcharts and/or block diagrams, and combinations of the blocks in the flowcharts and/or block diagrams can be implemented by computer-readable program instructions.

The computer-readable program instructions may be provided to a processor of a general-purpose computer, a special-purpose computer, or other programmable data processing apparatuses to produce a machine, such that when the instructions are executed by the processor of the computer or other programmable data processing apparatuses, an apparatus for implementing the functions/acts specified in one or more blocks of the flowcharts and/or block diagrams is created. The computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatuses, or other devices to cause a series of operational steps to be executed on the computer, other programmable apparatuses or other devices to produce a computer implemented process, such that the instructions executed on the computer, other programmable apparatuses or other devices implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowcharts or block diagrams may represent a module, a program segment, or a portion of instruction, which includes one or more executable instructions for implementing a specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by a special purpose hardware-based system that performs the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

What is claimed is:

1. A video repair method, comprising:
acquiring first forward optical flows and first reverse optical flows between adjacent images among continuous multiple frames of images;
respectively performing optical flow optimization processing on the first forward optical flows and the first reverse optical flows to obtain second forward optical flows corresponding to the first forward optical flows and second reverse optical flows corresponding to the first reverse optical flows;
performing forward conduction optimization on the continuous multiple frames of images by utilizing the second forward optical flows, and performing reverse conduction optimization on the continuous multiple frames of images by utilizing the second reverse optical flows until all the images in the optimized continuous multiple frames of images satisfy repair requirements; and
obtaining repaired images of the continuous multiple frames of images according to the optimized images obtained by the forward conduction optimization and the reverse conduction optimization.

2. The method according to claim 1, wherein acquiring the first forward optical flows and the first reverse optical flows between the adjacent images among the continuous multiple frames of images comprises:
acquiring a mask map of each image among the continuous multiple frames of images, wherein the mask map represents an area to be repaired of a corresponding image;
determining forward optical flows between the adjacent images in a forward sequence of time frames of the continuous multiple frames of images, and determining reverse optical flows between the adjacent images in a reverse sequence of the time frames of the continuous multiple frames of images; and
multiplying a forward optical flow between the $i^{-th}$ image and the $(i+1)^{-th}$ image by a mask map of the $(i+1)^{-th}$ image to obtain a first forward optical flow between the $i^{-th}$ image and the $(i+1)^{-th}$ image, and multiplying a reverse optical flow between the $(i+1)^{-th}$ image and the $i^{-th}$ image by a mask map of the $i^{-th}$ image to obtain a first reverse optical flow between the $(i+1)^{-th}$ image and the $i^{-th}$ image, wherein i is a positive integer greater than or equal to 1 and less than G, and G is the number of images among the continuous multiple frames of images.

3. The method according to claim 1, wherein respectively performing the optical flow optimization processing on the first forward optical flows and the first reverse optical flows comprises:

connecting the first forward optical flows to obtain a first connection optical flow, and connecting the first reverse optical flows to obtain a second connection optical flow;

respectively performing N optical flow optimization processings on the first connection optical flow and the second connection optical flow to obtain a first optimized optical flow corresponding to the first connection optical flow, and a second optimized optical flow corresponding to the second connection optical flow, wherein N is a positive integer greater than or equal to 1; and obtaining a second forward optical flow corresponding to each first forward optical flow according to the first optimized optical flow, and obtaining a second reverse optical flow corresponding to each first reverse optical flow according to the second optimized optical flow.

4. The method according to claim 3, wherein respectively performing the N optical flow optimization processings on the first connection optical flow and the second connection optical flow comprises:

performing a first optical flow optimization processing on the first connection optical flow and the second connection optical flow to obtain a first optimized sub-optical flow corresponding to the first connection optical flow, and a first optimized sub-optical flow corresponding to the second connection optical flow; and respectively performing the $(i+1)^{-th}$ optical flow optimization processing on the $i^{-th}$ optimized sub-optical flow of the first connection optical flow and the $i^{-th}$ optimized sub-optical flow of the second connection optical flow to obtain the $(i+1)^{-th}$ optimized sub-optical flow corresponding to the first connection optical flow, and the $(i+1)^{-th}$ optimized sub-optical flow corresponding to the second connection optical flow, wherein i is a positive integer greater than 1 and less than N;

wherein by means of the $N^{-th}$ optical flow optimization processing, the obtained $N^{-th}$ optimized sub-optical flow of the first connection optical flow is determined as the first optimized optical flow, and the obtained $N^{-th}$ optimized sub-optical flow of the second connection optical flow is determined as the second optimized optical flow, wherein each optical flow optimization processing comprises residual processing and up-sampling processing.

5. The method according to claim 1, wherein performing the forward conduction optimization on the continuous multiple frames of images by utilizing the second forward optical flows comprises:

acquiring a mask map of each image among the continuous multiple frames of images, wherein the mask map represents an area to be repaired of a corresponding image;

obtaining first repaired images of images other than a first image according to the second forward optical flows in a forward sequence of time frames of the continuous multiple frames of images; and adjusting the mask map of the corresponding image on the basis of an obtained first repaired image, and returning to execute the previous step until the adjusted mask map indicates that no area to be repaired exists, to determine that the images among the continuous multiple frames of images satisfy repair requirements.

6. The method according to claim 5, wherein obtaining the first repaired image of each image according to the second forward optical flows in the forward sequence of the time frames of the continuous multiple frames of images comprises:

performing offset processing on the first image according to the first second forward optical flow in the forward sequence of the time frames of the continuous multiple frames of images to obtain a first repaired image of a second image; and performing summation processing on the $k^{-th}$ image and a repaired image of the $k^{-th}$ image to obtain a first summation image of the $k^{-th}$ image, and performing offset processing on the $k^{-th}$ first summation image according to the $k^{-th}$ second forward optical flow to obtain a first repaired image of the $(k+1)^{-th}$ image, wherein k is a positive integer greater than 1 and less than G, and G represents the number of images among the multiple frames of images.

7. The method according to claim 1, wherein performing the reverse conduction optimization on the continuous multiple frames of images by utilizing the second forward optical flows comprises:

acquiring a mask map of each image among the continuous multiple frames of images, wherein the mask map represents an area to be repaired of a corresponding image;

obtaining second repaired images of the images other than the first image according to the second reverse optical flows in a reverse sequence of time frames of the continuous multiple frames of images; and adjusting the mask map of the corresponding image on the basis of an obtained second repaired image, and returning to execute the previous step until the adjusted mask map indicates that no area to be repaired exists, to determine that the images among the continuous multiple frames of images satisfy repair requirements.

8. The method according to claim 7, wherein obtaining the second repaired images of the images other than the first image according to the second reverse optical flows in the reverse sequence of the time frames of the multiple frames of images comprises:

performing offset processing on the first image according to the first second reverse optical flow in the reverse sequence of the time frames of the continuous multiple frames of images to obtain a second repaired image of the second image; and performing summation processing on the $h^{-th}$ image and a repaired image of the $h^{-th}$ image to obtain a second summation image of the $h^{-th}$ image, and performing offset processing on the $h^{-th}$ second summation image according to the $h^{-th}$ second reverse optical flow to obtain a second repaired image of the $(h+1)^{-th}$ image, wherein h is a positive integer greater than 1 and less than or equal to G, and G represents the number of images among the continuous multiple frames of images.

9. The method according to claim 1, wherein obtaining the repaired images of the continuous multiple frames of images according to the optimized images obtained by the forward conduction optimization and the reverse conduction optimization comprises:
- obtaining, in a forward sequence of time frames of the continuous multiple frames of images, a first optimized image obtained by the forward conduction optimization;
- obtaining, in the forward sequence of the time frames of the continuous multiple frames of images, a second optimized image obtained by the reverse conduction optimization; and
- obtaining a repaired image of each image according to average values of the first optimized image and the second optimized image of the image, so as to obtain the repaired image of each image among the continuous multiple frames of images.

10. The method according to claim 1, wherein the method comprises: performing, by means of an optical flow optimization module, optical flow optimization processing respectively performed on the first forward optical flows and the first reverse optical flows to obtain the second forward optical flows corresponding to the first forward optical flows, and the second reverse optical flows corresponding to the first reverse optical flows;
the method further comprises: a step of training the optical flow optimization module, comprising:
- acquiring a training sample, wherein the training sample comprises multiple groups of optical flow samples, and a mask sample and a real optical flow corresponding to each optical flow sample;
- performing the optical flow optimization processing on the optical flow sample by utilizing the optical flow optimization module to obtain a corresponding optimized optical flow;
- selecting, on the basis of a result of comparison between the optimized optical flow and the real optical flow, a first pixel point satisfying a first requirement from the optimized optical flow, and adjusting a mask value of the first pixel point in the mask map to obtain a new mask sample;
- obtaining, according to a preset loss function, a loss value on the basis of the optimized optical flow, an original mask sample, and the new mask sample; and
- obtaining a trained optical flow optimization module if the loss value satisfies training requirements, and otherwise, adjusting network parameters of the optical flow optimization module and re-performing the optical flow optimization processing of the optical flow sample until the obtained loss value satisfies the training requirements.

11. A video repair apparatus, comprising:
a processor; and
a memory configured to store processor-executable instructions,
wherein the processor is configured to invoke the instructions stored in the memory, so as to:
- acquire first forward optical flows and first reverse optical flows between adjacent images among continuous multiple frames of images;
- respectively perform optical flow optimization processing on the first forward optical flows and the first reverse optical flows to obtain second forward optical flows corresponding to the first forward optical flows and second reverse optical flows corresponding to the first reverse optical flows;
- perform forward conduction optimization on the continuous multiple frames of images by utilizing the second forward optical flows, and perform reverse conduction optimization on the continuous multiple frames of images by utilizing the second reverse optical flows until all the images in the optimized continuous multiple frames of images satisfy repair requirements; and
- obtain repaired images of the continuous multiple frames of images according to the optimized images obtained by the forward conduction optimization and the reverse conduction optimization.

12. The apparatus according to claim 11, wherein acquiring the first forward optical flows and the first reverse optical flows between adjacent images among continuous multiple frames of images comprises:
- acquiring a mask map of each image among the continuous multiple frames of images, determining forward optical flows between the adjacent images in a forward sequence of time frames of the continuous multiple frames of images, and determining reverse optical flows between the adjacent images in a reverse sequence of the time frames of the continuous multiple frames of images; and
- multiplying a forward optical flow between the $i^{-th}$ image and the $(i+1)^{-th}$ image by a mask map of the $(i+1)^{-th}$ image to obtain a first forward optical flow between the $i^{-th}$ image and the $(i+1)^{-th}$ image, and multiplying a reverse optical flow between the $(i+1)^{-th}$ image and the $i^{-th}$ image by a mask map of the $i^{-th}$ image to obtain a first reverse optical flow between the $(i+1)^{-th}$ image and the $i^{-th}$ image, wherein the mask map represents an area to be repaired of a corresponding image, i is a positive integer greater than or equal to 1 and less than G, and G is the number of images among the multiple frames of images.

13. The apparatus according to claim 11, wherein respectively performing the optical flow optimization processing on the first forward optical flows and the first reverse optical flows comprises:
- connecting the first forward optical flows to obtain a first connection optical flow, and connecting the first reverse optical flows to obtain a second connection optical flow;
- respectively performing N optical flow optimization processings on the first connection optical flow and the second connection optical flow to obtain a first optimized optical flow corresponding to the first connection optical flow, and a second optimized optical flow corresponding to the second connection optical flow, wherein N is a positive integer greater than or equal to 1; and
- obtaining a second forward optical flow corresponding to each first forward optical flow according to the first optimized optical flow, and obtaining a second reverse optical flow corresponding to each first reverse optical flow according to the second optimized optical flow.

14. The apparatus according to claim 13, wherein respectively performing the N optical flow optimization processings on the first connection optical flow and the second connection optical flow comprises:
- performing a first optical flow optimization processing on the first connection optical flow and the second connection optical flow to obtain a first optimized sub-optical flow corresponding to the first connection optical flow, and a first optimized sub-optical flow corresponding to the second connection optical flow; and
- respectively performing the $(i+1)^{-th}$ optical flow optimization processing on the $i^{-th}$ optimized sub-optical flow of the first connection optical flow and the $i^{-th}$ optimized sub-optical flow of the second connection optical flow to obtain the $(i+1)^{-th}$ optimized sub-optical flow corresponding to the first connection optical flow, and the $(i+1)^{-th}$ optimized sub-optical flow corresponding to the second connection optical flow, wherein i is a positive integer greater than 1 and less than N;

wherein by means of the $N^{-th}$ optical flow optimization processing, the obtained $N^{-th}$ optimized sub-optical flow of the first connection optical flow is determined as the first optimized optical flow, and the obtained $N^{-th}$ optimized sub-optical flow of the second connection optical flow is determined as the second optimized optical flow, wherein each optical flow optimization processing comprises residual processing and upper sampling processing.

15. The apparatus according to claim 11, wherein performing the forward conduction optimization on the continuous multiple frames of images by utilizing the second forward optical flows comprises:

acquiring a mask map of each image among the continuous multiple frames of images, wherein the mask map represents an area to be repaired of a corresponding image;

obtaining first repaired images of images other than a first image according to the second forward optical flows in a forward sequence of time frames of the continuous multiple frames of images; and adjusting the mask map of the corresponding image on the basis of an obtained first repaired image, and returning to execute the previous step until the adjusted mask map indicates that no area to be repaired exists, to determine that the images among the continuous multiple frames of images satisfy repair requirements.

16. The apparatus according to claim 15, wherein obtaining the first repaired image of each image according to the second forward optical flows in the forward sequence of the time frames of the continuous multiple frames of images comprises:

performing offset processing on the first image according to the first second forward optical flow in the forward sequence of the time frames of the continuous multiple frames of images to obtain a first repaired image of a second image; and performing summation processing on the $k^{-th}$ image and a repaired image of the $k^{-th}$ image to obtain a first summation image of the $k^{-th}$ image, and performing offset processing on the $k^{-th}$ first summation image according to the $k^{-th}$ second forward optical flow to obtain a first repaired image of the $(k+1)^{-th}$ image, wherein k is a positive integer greater than 1 and less than G, and G represents the number of images among the multiple frames of images.

17. The apparatus according to claim 11, wherein performing the reverse conduction optimization on the continuous multiple frames of images by utilizing the second reverse optical flows comprises:

acquiring a mask map of each image among the continuous multiple frames of images, wherein the mask map represents an area to be repaired of a corresponding image;

obtaining second repaired images of the images other than the first image according to the second reverse optical flows in a reverse sequence of time frames of the continuous multiple frames of images; and adjusting the mask map of the corresponding image on the basis of an obtained second repaired image, and returning to execute the previous step until the adjusted mask map indicates that no area to be repaired exists, to determine that the images among the continuous multiple frames of images satisfy repair requirements.

18. The apparatus according to claim 17, wherein the obtaining the second repaired images of the images other than the first image according to the second reverse optical flows in the reverse sequence of the time frames of the multiple frames of images comprises:

performing offset processing on the first image according to the first second reverse optical flow in the reverse sequence of the time frames of the continuous multiple frames of images to obtain a second repaired image of the second image; and performing summation processing on the $h^{-th}$ image and a repaired image of the $h^{-th}$ image to obtain a second summation image of the $h^{-th}$ image, and performing offset processing on the $h^{-th}$ second summation image according to the $h^{-th}$ second reverse optical flow to obtain a second repaired image of the $(h+1)^{-th}$ image, wherein h is a positive integer greater than 1 and less than or equal to G, and G represents the number of images among the continuous multiple frames of images.

19. The apparatus according to claim 11, wherein obtaining the repaired images of the continuous multiple frames of images according to the optimized images obtained by the forward conduction optimization and the reverse conduction optimization comprises:

obtaining, in a forward sequence of time frames of the continuous multiple frames of images, a first optimized image obtained by the forward conduction optimization;

obtaining, in the forward sequence of the time frames of the continuous multiple frames of images, a second optimized image obtained by the reverse conduction optimization; and obtaining a repaired image of each image according to average values of the first optimized image and the second optimized image of the image, so as to obtain the repaired image of each image among the continuous multiple frames of images.

20. A non-transitory computer-readable storage medium, having computer program instructions stored thereon, wherein when the computer program instructions are executed by a processor, the processor is caused to perform the operations of:

acquiring first forward optical flows and first reverse optical flows between adjacent images among continuous multiple frames of images;

respectively performing optical flow optimization processing on the first forward optical flows and the first reverse optical flows to obtain second forward optical flows corresponding to the first forward optical flows and second reverse optical flows corresponding to the first reverse optical flows;

performing forward conduction optimization on the continuous multiple frames of images by utilizing the second forward optical flows, and performing reverse conduction optimization on the continuous multiple frames of images by utilizing the second reverse optical flows until all the images in the optimized continuous multiple frames of images satisfy repair requirements; and obtaining repaired images of the continuous multiple frames of images according to the optimized images obtained by the forward conduction optimization and the reverse conduction optimization.

* * * * *